(12) United States Patent
    Filippov et al.

(10) Patent No.: US 11,102,481 B2
(45) Date of Patent: Aug. 24, 2021

(54) METHOD AND APPARATUS FOR VIDEO CODING

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 15/980,294

(22) Filed: May 15, 2018

(65) Prior Publication Data
    US 2018/0262756 A1    Sep. 13, 2018

Related U.S. Application Data

(63) Continuation of application No. PCT/RU2015/000796, filed on Nov. 17, 2015.

(51) Int. Cl.
    *H04N 19/117* (2014.01)
    *H04N 19/593* (2014.01)
    *H04N 19/82* (2014.01)
    *H04N 19/13* (2014.01)
    *H04N 19/59* (2014.01)
    (Continued)

(52) U.S. Cl.
    CPC ......... *H04N 19/117* (2014.11); *H04N 19/13* (2014.11); *H04N 19/157* (2014.11); *H04N 19/184* (2014.11); *H04N 19/196* (2014.11); *H04N 19/439* (2014.11); *H04N 19/59* (2014.11); *H04N 19/593* (2014.11); *H04N 19/82* (2014.11)

(58) Field of Classification Search
    CPC .. H04N 19/117; H04N 19/157; H04N 19/439; H04N 19/82
    See application file for complete search history.

(56) References Cited

U.S. PATENT DOCUMENTS

| 2006/0019634 A1 | 1/2006 | Hawkes |
| 2008/0118070 A1 | 5/2008 | Yeap et al. |

(Continued)

FOREIGN PATENT DOCUMENTS

| CN | 101188496 A | 5/2008 |
| CN | 101616142 A | 12/2009 |

(Continued)

OTHER PUBLICATIONS

Sullivan et al., "Overview of the High Efficiency Video Coding (HEVC) Standard", IEEE Transactions on Circuits and Systems for Video Technology, vol. 22, No. 12, XP55045358, Institute of Electrical and Electronics Engineers, New York, New York (Dec. 2012).

(Continued)

*Primary Examiner* — Jeremiah C Hallenbeck-Huber
(74) *Attorney, Agent, or Firm* — Leydig, Voit & Mayer, Ltd.

(57) ABSTRACT

A video coding device, comprising a sequence of filters that are configurable by one or more primary parameters and one or more secondary parameters, and a filter controller configured to adjust the one or more secondary parameters based on the one or more primary parameters and based on a strength criterion of the sequence of filters.

15 Claims, 15 Drawing Sheets

(51) Int. Cl.
  *H04N 19/196* (2014.01)
  *H04N 19/42* (2014.01)
  *H04N 19/157* (2014.01)
  *H04N 19/184* (2014.01)

(56) References Cited

U.S. PATENT DOCUMENTS

| | | | |
|---|---|---|---|
| 2008/0165848 | A1 | 7/2008 | Ye et al. |
| 2008/0267297 | A1 | 10/2008 | Sampedro et al. |
| 2009/0225842 | A1 | 9/2009 | Cheon et al. |
| 2011/0154036 | A1 | 6/2011 | Wong et al. |
| 2012/0051438 | A1 | 3/2012 | Chong et al. |
| 2012/0082224 | A1 | 4/2012 | Van Der Auwera et al. |
| 2012/0147955 | A1 | 6/2012 | Budagavi |
| 2012/0183041 | A1* | 7/2012 | Maani ............ H04N 19/176 375/240.02 |
| 2013/0028327 | A1 | 1/2013 | Narroschke et al. |
| 2013/0094569 | A1 | 4/2013 | Chong et al. |
| 2013/0114708 | A1* | 5/2013 | Van der Auwera .. H04N 19/176 375/240.12 |
| 2013/0182780 | A1 | 7/2013 | Alshin et al. |
| 2013/0215974 | A1* | 8/2013 | Chong ............ H04N 19/463 375/240.24 |
| 2013/0243104 | A1 | 9/2013 | Chen et al. |
| 2013/0272623 | A1* | 10/2013 | Jeon ............ H04N 19/176 382/238 |
| 2014/0233660 | A1 | 8/2014 | Sato |
| 2014/0328414 | A1 | 11/2014 | Puri et al. |
| 2014/0334543 | A1* | 11/2014 | Lee ............ H04N 19/70 375/240.12 |
| 2015/0023405 | A1* | 1/2015 | Joshi ............ H04N 19/593 375/240.02 |
| 2015/0172677 | A1 | 6/2015 | Norkin |
| 2017/0034536 | A1 | 2/2017 | Filippov et al. |
| 2017/0048528 | A1 | 2/2017 | Filippov et al. |

FOREIGN PATENT DOCUMENTS

| | | |
|---|---|---|
| CN | 101669360 A | 3/2010 |
| CN | 102972022 A | 3/2013 |
| CN | 103081467 A | 5/2013 |
| CN | 103297225 A | 9/2013 |
| CN | 104662902 A | 5/2015 |
| JP | 2013093792 A | 5/2013 |
| JP | 2014532375 A | 12/2014 |
| JP | 2015511472 A | 4/2015 |
| RU | 2543552 C2 | 3/2015 |

OTHER PUBLICATIONS

Maani et al., "Improvement of Adaptive Intra Smoothing by Switching Interpolation Filters," Joint Collaborative Team on Video Coding (JCT-VC) of ITU-T SG16 WP3 and ISO/IEC JTC1/SC29/WG11, 4th Meeting: Daegu, KR, JCTVC-O391_r1, XP030047737, International Telecommunication Union, Geneva, Switzerland (Jan. 20-28, 2011).
Zheng et al, "CE13: Mode Dependent Hybrid Intra Smoothing," Joint Collaborative Team on Video Coding (JCT-VC) of ITU-T SG16 WP3 and ISO/IEC JTC1/SC29/WG11 4th Meeting: Daegu, KR, JCTVC-D282, International Telecommunication Union, Geneva, Switzerland (Jan. 20-28, 2011).
Chen et al., "Non-RCE2: Enhanced angular intra prediction for screen content coding," Joint Collaborative Team on Video Coding (JCT-VC) of ITU-T SG 16 WP 3 and ISO/IEC JTC 1/SC 29/WG 11, JCTVC-N0183, 14th Meeting: Vienna, International Telecommunication Union, Geneva, Switzerland (Jul. 25-Aug. 2, 2013).
Tsai et al., "Adaptive Loop Filtering for Video Coding", IEEE Journal of Selected Topics in Signal Processing, vol. 7, No. 6, XP055265962, Institute of Electrical and Electronics Engineers, New York, New York (Dec. 2013).
"Series H: Audiovisual and Multimedia Systems Infrastructure of audiovisual services—Coding of moving video Advanced video coding for generic audiovisual services," Telecommunication Standardization Sector of ITU, ITU-T H.264, International Telecommunication Union, Geneva, Switzerland (Feb. 2014).
"Series H: Audiovisual and Multimedia Systems Infrastructure of audiovisual services—Coding of moving video High efficiency video coding," ITU-T H.265, Telecommunication Standardization Sector of ITU, International Telecommunication Union, Geneva, Switzerland (Apr. 2015).
Clare et al, "Sign Data Hiding," Joint Collaborative Team on Video Coding (JCT-VC) of ITU-T SG16 WP3 and ISO/IEC JTC1/SC29/WG11 7th Meeting: Geneva, CH, JCTVC-G271, m21833, International Telecommunication Union, Geneva, Switzerland (Nov. 21-30, 2011).
Bossen "Common test conditions and software reference configurations," Joint Collaborative Team on Video Coding (JCT-VC) of ITU-T SG16 WP3 and ISO/IEC JTC1/SC29/WG11 12th Meeting: Geneva, JCTVC-L1100, WG11 No. m28412, International Telecommunication Union, Geneva, Switzerland (Jan. 14-23, 2013).
Filippov et al, "Adaptive Segmentation-based Filtering of Reference Samples for Intra Prediction," Visual Communications and Image Processing Conference, Institute of Electrical and Electronic Engineers, New York, New York (2014).
"Reference sample adaptive filtering for intra coding," ITU-T SG16 Q6, COM16-C983 R1-E, International Telecommunications Union, Geneva Switzerland, (Sep. 2015).
Chen et al., "Algorithm Description of Joint Exploration Test Model 1," Joint Video Exploration Team (JVET) of ITU-T SG 16 WP 3 and ISO/IEC JTC 1/SC 29/WG 11 1nd Meeting: Geneva, CH, JVET-A1001, International Telecommunication Union, Geneva, Switzerland (Oct. 19-21, 2015).
Alshina et al., "Known tools performance investigation for next generation video coding," ITU—Telecommunications Standardization Sector Study Group 16 Question 6 Video Coding Experts Group (VCEG), VCEG-AZ05, 52nd Meeting: Warsaw Poland (Jun. 19-26, 2015).
"Series H: Audiovisual and Multimedia Systems Infrastructure of audiovisual services—Coding of moving video, High efficiency video coding," H.265, Telecommunication Standardization Sector of ITU, International Telecommunication Union, Geneva Switzerland (Apr. 2013).
Chen et al., "Further improvements to HMKTA-1.0," ITU—Telecommunications Standardization Sector Study Group 16 Question 6 Video Coding Experts Group (VCEG), VCEG-AZ07 v2, 52nd Meeting, Warsaw, Poland (Jun. 19-26, 2015).
BR/1120180099210, Office Action, dated Aug. 24, 2020.

* cited by examiner

METHOD AND APPARATUS FOR VIDEO CODING

CROSS-REFERENCE TO RELATED APPLICATIONS

This application is a continuation of International Application No. PCT/RU2015/000796, filed on Nov. 17, 2015, the disclosure of which is hereby incorporated by reference in its entirety.

TECHNICAL FIELD

Embodiments of the present disclosure relate to a video coding device and to a method for configuring a sequence of filters for video coding.

Embodiments of the present disclosure also relate to a computer-readable storage medium storing program code, the program code comprising instructions for carrying out a method for configuring a sequence of filters for video coding.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and constrained by two contradicting parameters: compression efficiency and computational complexity. Video coding standards, such as ITU-T H.264/AVC or ITU-T H.265/HEVC, provide a good tradeoff between these parameters.

State-of-the-art video coding standards are mostly based on partitioning of a source picture into blocks. Processing of these blocks depends on their size, spatial position and a coding mode specified by an encoder. Coding modes can be classified into two groups according to the type of prediction: intra- and inter-prediction modes. Intra-prediction modes use pixels of the same picture to generate reference samples to calculate the prediction values for the pixels of the block being reconstructed. Intra-prediction could be also referred to as spatial prediction. Inter-prediction modes are designed for temporal prediction and uses reference samples of previous or next pictures to predict pixels of the block of the current picture.

Due to different types of redundancy, prediction processes for intra- and inter-coding are different. Intra-prediction typically constructs a one-dimensional buffer of reference samples. Inter-prediction typically uses sub-pixel interpolation of two-dimensional reference pixel matrix. To improve prediction results, additional processing can be used for both intra- and inter-coding (e.g., smoothing of reference samples for intra-prediction, sharpening of reference blocks for inter-prediction).

The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity.

Similar to the ITU-T H.264/AVC video coding standard, the HEVC/H.265 video coding standard provides for a division of the source picture into blocks, e.g. coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction PU specifies prediction mode for a set of transform units (TUs). A TU can have different sizes (e.g., 4×4, 8×8, 16×16 and 32×32 pixels) and can be processed in different ways. For a TU transform coding is being performed, i.e. the prediction error is being transformed with a discrete cosine transform (DCT) and quantized. Hence, reconstructed pixels contain quantization noise and blocking artefacts that can influence prediction accuracy.

In order to reduce this influence on intra-prediction, reference pixels filtering has been adopted for HEVC/H.265. For inter-prediction, reference pixels are calculated using sub-pixel interpolation. Reference pixels smoothing in the case of motion compensation can be combined with anti-aliasing filtering of sub-pixel interpolation process.

Mode adaptive intra prediction smoothing techniques have been presented. Smoothing filtering depends on the selected intra-prediction mode and a flag encoded in the video bit stream. Depending on the defined intra-prediction mode for a block, reference samples could be either smoothed by a filter or used without being modified. For the case when reference samples are smoothed, selection of smoothing filter can be based also on intra-prediction mode. Additionally, this selection could be performed according to the value of a flag reconstructed from a bit stream.

The current HEVC/H.265 standard uses this technique partially. Specifically, filter smoothing is turned off for several combinations of intra-mode and block size.

A reference sample adaptive filter (RSAF) has been suggested as an extension of the reference sample filter adopted for the HEVC/H.265 standard. This adaptive filter segments reference samples before smoothing to apply different filters to different segments. In addition, a data hiding procedure has been used to signal a smoothing flag. A simplified version of adaptive filter for reference samples was adopted for the Joint Exploration Model 1 (JEM1) that contains several other tools which use smoothing, including:
- Four-tap intra interpolation filter,
- Boundary prediction filters, and/or
- Multi-parameter Intra prediction (MPI), which can be replaced by Position Dependent Intra Prediction Combination (PDPC)

Problems of the above methods include a high signaling effort and an oversmoothing of the video during encoding or decoding.

SUMMARY

The objective of the present disclosure is to provide a video coding device and a method for configuring a filter sequence for video coding, wherein the video coding device and the method for configuring a filter sequence allow to overcome one or more of the above-mentioned problems.

A first aspect of the disclosure provides a video coding device, comprising:
- a sequence of filters that are configurable by one or more primary parameters and one or more secondary parameters, and
- a filter controller configured to adjust the one or more secondary parameters based on the one or more primary parameters and based on a strength criterion of the sequence of filters.

The video coding device of the first aspect can adjust the one or more secondary parameters such that a strength criterion of the sequence of filters is fulfilled. For example, as outlined below, the strength criterion can relate to an overall smoothness and the filter controller can set the secondary parameters such that an overall smoothness of the sequence of filtering steps is not too high and not too low. In other words, the filter controller can be configured to ensure that a strength criterion of the sequence of filters is within a predetermined range.

The video coding device of the first aspect can be configured for video encoding and/or decoding.

The filter controller can be configured to only partially set one or more of the secondary parameters. For example, a secondary parameter can be read from a bitstream or a user setting and adjusted, e.g. within a certain range, by the filter controller. In other implementations, the filter controller can also be configured to override a value of a secondary parameter that has been derived otherwise, e.g. from a bitstream or a user setting.

In prior art, inharmonious work of video coding tools including RSAF can result in oversmoothing that
  reduces the overall coding performance since a next filter does not take into account the effects caused by previous filters, and/or
  increases the overall computational complexity as all the above mentioned filters are constantly turned on.

This can be avoided with the video coding device of the first aspect. Furthermore, since the secondary parameters need not be stored in a bitstream, in certain implementations a signaling effort can be reduced.

In a specific implementation, the video coding device of the first aspect can solve the mentioned problem of oversmoothing by adjusting parameter of those filters of the filter sequence that use smoothing. This adjustment can be reached for example by introducing a flag or some conditions for the filters that use smoothing. The flag and/or the conditions can be used
  to turn on and off the smoothing mechanisms of the tools, and/or
  to change the smoothing strength of filters (e.g., switching from strong filters to weak ones).

The filter controller of the video coding device of the first aspect can be configured to control not just a single filter, but multiple filters. This can be considered as a mechanism for harmonizing different filters that impact the results of intra-prediction, e.g. by smoothing. In particular, the filter controller can be configured to make the following adjustments:
  a sample processing mechanism can be changed as some filter modules can be switched off subject to a flag value and/or fulfilling some conditions;
  a new filter module can be introduced to provide the control over all filters that can impact the results of intra-prediction by smoothing them.

In a first implementation of the video coding device according to the first aspect, the strength criterion comprises:
  a smoothness criterion,
  a ratio of an amplification factor for a high-frequency domain and an amplification factor for a low-frequency domain, and/or
  a ratio of a contrast value before filtering and a contrast value after filtering.

This allows optimizing the sequence of filters for one or more of the above criteria. As outlined above, for example the adjustments by the filter controller can be performed such that the strength criterion of the sequence of filters is within a certain range, e.g. a predetermined range.

In a second implementation of the video coding device according to the first aspect, the one or more primary parameters are predetermined parameters, in particular parameters that are predetermined from an encoded bitstream, a user setting and/or a parameter search loop at an encoding device.

Determining the secondary parameters from the primary parameters, wherein for example only the primary parameters are predetermined, has the advantage that a signaling effort can be reduced. For example, a bitrate can be reduced if the secondary parameters are not stored in the bitstream, but can be derived from the primary parameters in the bitstream.

In a third implementation of the video coding device according to the first aspect, the sequence of filters comprises one or more primary filters that are configurable by one or more primary parameters and one or more secondary filters that are configurable by one or more secondary parameters, wherein the one or more primary filters are located in the sequence of filters before the one or more secondary filters.

Adjusting parameters of filters at later stages has the advantage that an effect of the earlier stage filters can possibly be undone or at least not further intensified. For example, if early stage filters have yielded a certain smoothing strength, it can be ensured that the later filter stages do not increase this smoothing effect. For example, a smoothing flag of later filter stages can be switched off.

In other implementations of the disclosure, primary parameters can be related to later filter stages and secondary parameters to earlier filter stages.

In a fourth implementation of the video coding device according to the first aspect, the sequence of filters comprises:
  a reference sample filter configured to adaptively filter one or more neighbouring samples of a current video block to obtain one or more reference samples, and
  an interpolation filter configured to predict one or more samples of the current video block using an interpolation of the one or more reference samples,
wherein the one or more primary parameters comprise a reference parameter of the reference sample filter and the one or more secondary parameters comprise a selection parameter of the interpolation filter, wherein the interpolation filter is configured to use an interpolation method according to the selection parameter.

The sequence of filters of the video coding device of the fourth implementation can be for example a sequence of filters for intra-prediction.

For example, the filter controller is configured to determine the selection parameter based on the reference parameter. This has shown to be an effective method of improving an overall filter strength criterion.

In a fifth implementation of the video coding device according to the first aspect, the one or more primary parameters include a reference samples filter flag of a reference samples filter and the one or more secondary parameters include a filter strength parameter of an intra-prediction interpolation filter.

For example, the filter controller is configured to determine the filter strength parameter based on the reference samples filter flag. This has shown to be an effective method of improving an overall filter strength criterion.

In a sixth implementation of the video coding device according to the first aspect, the sequence of filters comprises a boundary smoothing filter which is configured to perform boundary smoothing for one or more transform units that belong to one or more prediction units that meet a size constraint.

This has the advantage that a boundary smoothing filter reduces the visibility of blocking artifacts for reconstructed blocks. A prediction unit typically contains picture region of a certain kind: edge, texture, smooth region, etc. However, for larger PUs probability of a smooth region is higher. For smooth regions blocking artifacts are more crucial and hence, boundary smoothing for large PUs are more preferable than for smaller ones. Consequently, it is proposed to constrain boundary smoothing with PU size (e.g. by the size of 32×32 pixels). By using this constraint it is possible, on the one hand, to avoid undesired blur for non-smooth regions of smaller PUs and on the other hand, to reduce blocking artifacts for larger PUs.

This allows improving both objective and subjective quality as compared to the case when boundary smoothing is predefined for intra-prediction.

In a seventh implementation of the video coding device according to the first aspect, the one or more primary parameters include a direction parameter of a predicted block filter and the one or more secondary parameters include an on-off parameter of a boundary smoothing filter.

For example, the filter controller is configured to determine the on-off parameter of the boundary smoothing filter based on the direction parameter of the predicted block filter. This has shown to be an effective method of improving an overall filter strength criterion.

In an eighth implementation of the video coding device according to the first aspect, the sequence of filters comprises:
  a sub-pixel interpolation filter configured to adaptively filter samples of a reference block to obtain an interpolated reference block, and
  a low pass and/or a high pass filter configured to smoothen and/or sharpen the interpolated reference block to obtain a filtered reference block,
wherein the one or more primary parameters comprise an interpolation parameter of the interpolation filter and the one or more secondary parameters comprise a selection parameter of the sharpening and/or smoothing filters, wherein the derivation of the secondary parameters is determined by the parameter of the interpolation filter.

The sequence of filters of the video coding device of the eighth implementation can be for example a sequence of filters for inter-prediction.

For example, the filter controller is configured to determine the selection parameter of the sharpening and/or smoothing filters based on the interpolation parameter. This has shown to be an effective method of improving an overall smoothness criterion.

It is noted that a smoothness criterion of the sequence of filters can also be position dependent. For example, a filter might introduce a strong smoothness in one region and a strong sharpness in another region. Thus, the filter controller might be configured to set different secondary parameters for different regions of one or more image frames of the video.

In a ninth implementation of the video coding of the video coding device of first aspect, the sequence of filters comprises an adaptive loop filter configured to use a selected codebook to indicate one or more filter coefficients in a bitstream, wherein the filter controller is configured to select the codebook out of a plurality of codebooks based on the one or more primary parameters.

Adaptive-loop filter coefficients being encoded by a plurality of codebooks takes advantage of the prior information on processing that was applied to an input signal of the adaptive loop filter. If a smoothing has already been applied to a signal being processed by the adaptive loop filter, it is known that the adaptive loop filter can only introduce high-pass filtering. Therefore, some of the combinations of coefficients of the adaptive loop filter become unavailable. This property is used to keep two or more codebooks accordingly for at least two cases: when an adaptive loop filter is applied to an already smoothed input signal and when no smoothing was applied to the input of the adaptive loop filter.

For example, the plurality of codebooks can comprise a first and a second codebook, wherein the first codebook only comprises coefficients for both high-pass and low-pass filtering and the second codebook only comprises coefficients for low-pass filtering.

In a specific implementation, the plurality of codebooks comprises more than two codebooks, wherein for example the different codebooks of the plurality of codebooks correspond to different filtering strengths of filters applied before ALF.

In a tenth implementation of the video coding device according to the ninth implementation of the first aspect, the sequence of filters further comprises:
  a deblocking filter configured to process vertical edges based on a vertical filter strength parameter and/or horizontal edges based on a horizontal filter strength parameter, and
  a sample adaptive offset, SAO, filter configured to classify pixels and add offset values to the pixels in accordance with a SAO class parameter,
wherein the one or more primary parameters comprise the SAO class parameter and a SAO type parameter of the SAO filter and the one or more secondary parameters comprise the horizontal filter strength parameter and the vertical strength parameter wherein the filter controller is configured to derive the secondary parameters based on the SAO class parameter and/or the SAO type parameter of the SAO filter, and/or wherein the filter controller is configured to select the codebook out of the plurality of codebooks based on the SAO type parameter.

The sequence of filters of the video coding device of the tenth implementation can be for example a sequence of in-loop filters.

A further implementation of the video coding device of the first aspect relates to a video coding device of one of the previous implementations of the first aspect, wherein the secondary parameters of vertical and horizontal edges deblocking filter strength is different and wherein a ratio of the vertical deblocking filter strength and the horizontal deblocking filter strength is adjusted based on said SAO class.

A further implementation of the video coding device of the first aspect relates to a video coding device of one of the previous implementations of the first aspect, wherein the sequence of filters does not contain an adaptive loop filter or wherein the filter controller does not adjust parameters of an in-loop filter.

A further implementation of the video coding device of the first aspect relates to a video coding device of one of the previous implementations of the first aspect, wherein the sequence of filters does not contain a deblocking filter or wherein the filter controller does not adjust parameters of a deblocking filter.

A second aspect of the disclosure refers to a method for configuring a sequence of filters for video coding, the method comprising:

adjusting one or more secondary parameters based on one or more primary parameters and based on a strength criterion of the sequence of filters, and configuring the sequence of filters with the primary and secondary parameters.

In a first implementation of the method of the second aspect, the method further comprises an initial step of determining the one or more primary parameters from a bitstream.

The methods according to the second aspect of the disclosure can be performed by the video coding device according to the first aspect of the disclosure. Further features or implementations of the method according to the second aspect of the disclosure can perform the functionality of the video coding device according to the first aspect of the disclosure and its different implementation forms.

A third aspect of the disclosure refers to a computer-readable storage medium storing program code, the program code comprising instructions for carrying out the method of the third aspect or one of the implementations of the third aspect.

BRIEF DESCRIPTION OF THE DRAWINGS

To illustrate the technical features of implementations of the present disclosure more clearly, the accompanying drawings provided for describing the implementations are introduced briefly in the following. The accompanying drawings in the following description merely show some implementations of the present disclosure. Modifications of these implementations are possible without departing from the scope of the present disclosure as defined in the claims.

DETAILED DESCRIPTION

Figure 1:
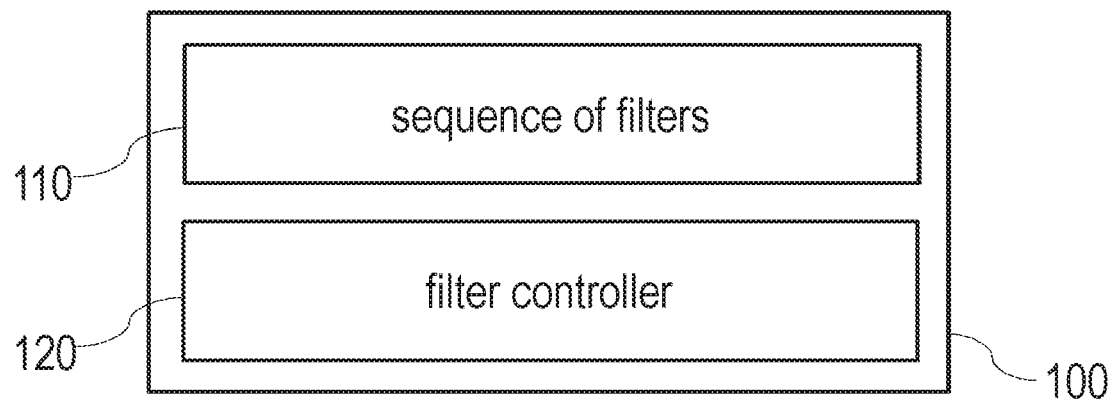
FIG. 1 is a block diagram illustrating a video coding device in accordance with an implementation of the present disclosure.

FIG. 1 shows a video coding device 100, which comprises a sequence of filters 110 and a filter controller 120.

The sequence of filters 110 is configurable by one or more primary parameters and one or more secondary parameters. For example, a first set of filters of the sequence of filters can be configurable by the primary parameters and a second set of filters of the sequence of filters can be configurable by the second set of filters. The first and second set of filters can be overlapping.

The filter controller 120 is configured to adjust the one or more secondary parameters based on the one or more primary parameters and based on a strength criterion of the sequence of filters 110. In particular, the filter controller 120 can be configured to adjust the one or more secondary parameters partially based on the one or more first parameters. For example, a value of a secondary parameter can be partially based on a predetermined value, e.g. from a bitstream, and partially based on the adjustment based on the primary parameters.

Figure 2:
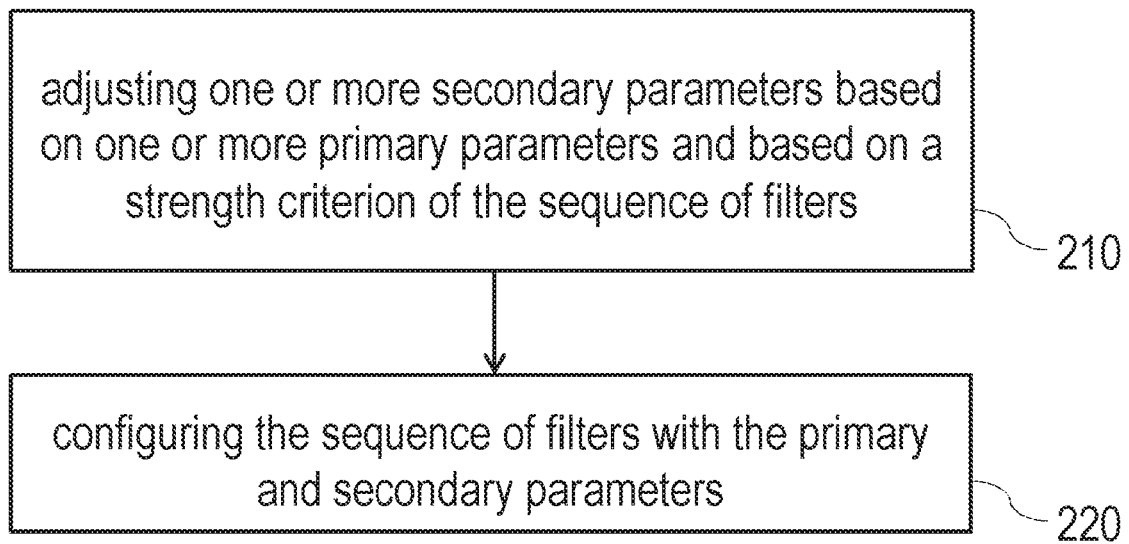
FIG. 2 is a flow chart of a method for configuring a sequence of filters for video coding in accordance with a further implementation of the present disclosure.

FIG. 2 shows a method 200 for configuring a sequence of filters for video coding. The method 200 comprises a first step 210 of adjusting one or more secondary parameters based on one or more primary parameters and based on a strength criterion of the sequence of filters. The method further comprises a second step 220 of configuring the sequence of filters with the primary and secondary parameters.

An intra prediction procedure can be part of a hybrid video coding tool chain at an encoder side and/or at a decoder side. Similarly, an inter-prediction procedure can comprise a sequence of filters (e.g., interpolation filters and so called prediction filters) that are potentially able to cause either oversmoothing or oversharpening of a block used as a reference that, in fact, is an analogue of an intra-predicted block for inter-prediction.

A sequence of filters can comprise e.g. one or more of the following filters:
- Reference sample smoothing (e.g., RSAF),
- Interpolation filtering for intra-prediction,
- Intra-predicted block filtering (e.g., MPI or PDPC), and/or
- Boundary smoothing.

These filters can impact the results of intra-prediction by smoothing.

Figure 3:
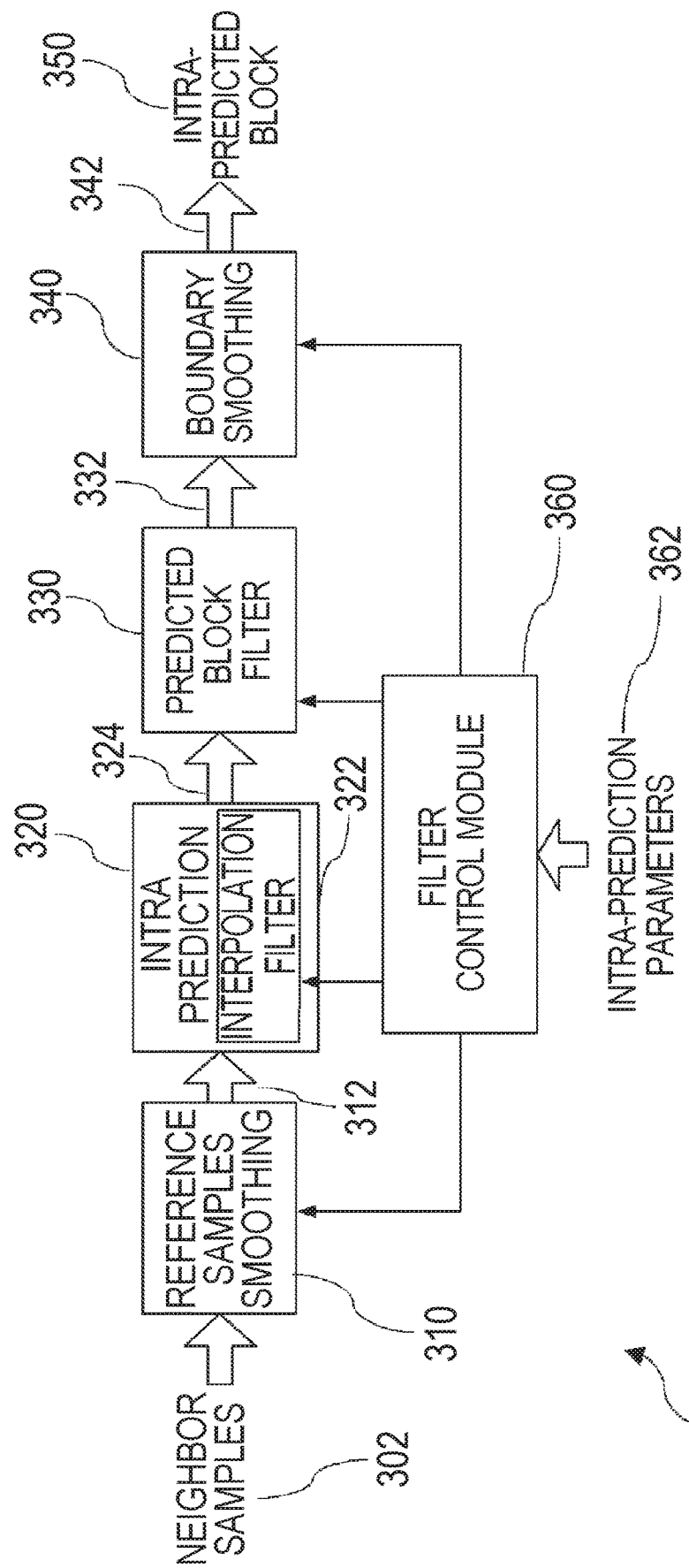
FIG. 3 is a structure scheme of a sequence of filters for intra-prediction in accordance with a further implementation of the present disclosure.

FIG. 3 illustrates a filter sequence 300 that comprises a filter control module 360 for adjusting filtering parameters at different stages of intra prediction. The filter controller module 360 is a filter controller.

Parameters of intra prediction can include, but are not limited to:
- a size of a prediction unit,
- a size of a block being predicted,
- an intra-prediction mode,
- a multi-parameter intra mode index, and/or
- a reference sample filtering flag.

One or more of the above parameters can primary or secondary parameters.

Aside from the filter control module 360, the sequence of filters 300 comprises a reference samples smoothing unit 310, an intra-prediction unit 320, a predicted block filter unit 330, and a boundary smoothing unit 340. The reference samples smoothing unit 310 is configured to be provided with one or more neighbor samples 302 as input. It is configured to smooth and/or further process the one or more neighbor samples 302 to obtain one or more reference samples 312, which are provided to the intra-prediction unit 320 as input. The intra-prediction unit 320 comprises an interpolation filter 322. The intra-prediction unit 320 provides its output 324 as input to the predicted block filter 330.

The predicted block filter 330 is configured to compute one or more predicted blocks 332, which are provided to the boundary smoothing unit 340 as input. The boundary smoothing unit 340 generates as output 342 one or more intra-predicted block 350.

A video coding device comprising the sequence of filters 300 can be configured to use implicit or explicit signaling of reference samples filter selectively, i.e. only to those TUs that meet specific conditions.

The filter control module 360 can be configured to read intra-prediction parameters 362 as primary parameters. It can be configured to derive secondary parameters based on these primary parameters.

Quad-tree partitioning results can be used as an indication of reference samples filter selection using explicit or implicit signaling. Particularly, if size of a PU is larger than a threshold value (for example, 32×32), the reference sample filter flag is set to zero. This assigning overrides conditions of the prior art. If a condition of a PU size is true, only "NO FILTER" and "APPLY WEAK FILTER" options could be selected in accordance with a PU size and/or intra mode conditions.

Figure 4:
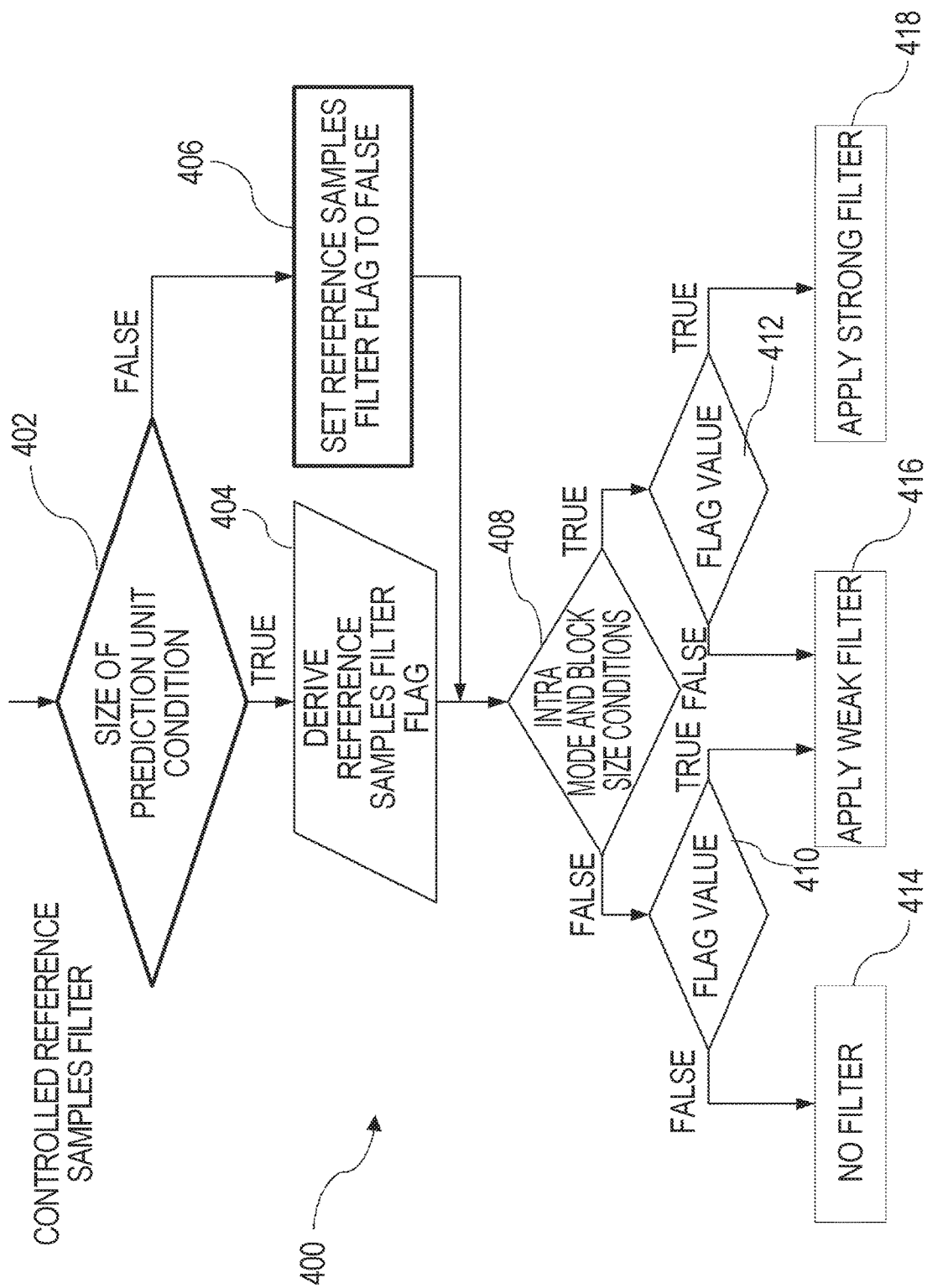
FIG. 4 is a flow chart of a method for configuring a sequence of filters for controlled reference sample adaptive filtering in accordance with a further implementation of the present disclosure.

FIG. 4 is a flow chart of a method 400 for configuring a sequence of filters for controlled reference sample adaptive filtering.

The method 400 comprises a first step 402 of evaluating a condition related to a size of a prediction unit. If the evaluation of the condition is true, the method continues in step 404, wherein a reference samples filter flag is derived. If the evaluation of the condition related to a size of a prediction unit is false, the method continues in step 406, wherein a reference samples filter flag is set to false. Step 404 or step 406 is followed by a step 408, wherein one or more conditions related to an intra-mode and a block size are evaluated.

If the evaluation result of step 408 is false, the method continues in step 410, wherein the reference samples filter flag is evaluated. If it is false, the method continues in step 414, wherein the reference sample adaptive filter is set to not apply a filter. If in step 410 the flag is evaluated as true, in step 416 a weak filter is applied. Alternatively, if the condition evaluation in step 408 was evaluated as true, the method continues in step 412, wherein the reference samples filter flag is evaluated. If the evaluation is false, in step 416 a weak filter is applied. If the reference samples filter flag is in step 412 evaluated as true, a strong filter is applied in step 418.

"APPLY WEAK FILTER" and "APPLY STRONG FILTER" stages can select a filter from a predefined set of filters, as soon as selection of a specific filter from the set is mapped to the intra mode and a size of a block being predicted. This particular implementation, which has just 3 filters, does not mean that the quantity of the filters within the filter set cannot be extended up to an arbitrary amount (e.g., 5 states including the state of "NO FILTER", a "WEAK FILTER", a "STRONG FILTER" and two intermediate filters).

In directional intra-prediction, a value of pixels of the predicted block and a projection on the left and top block boundaries is calculated. However, the projection may have a fractional position, i.e. it may fall between actual positions of reference samples on the boundary. A weighted sum of adjacent reference samples' values is calculated to determine a value of a sample of the intra-predicted block. This process is in fact a two-tap linear interpolation filter, which can be further extended to a four-tap interpolation filter.

Four-tap intra interpolation filters can be utilized to improve the directional intra prediction accuracy. In HEVC, a two-tap linear interpolation filter has been used to generate the intra prediction block in the directional prediction modes (i.e., excluding Planar and DC predictors). Alternatively, two types of four-tap interpolation filters can be used: Cubic interpolation filters for 4×4 and 8×8 blocks, and Gaussian interpolation filters for 16×16 and larger blocks. The parameters of the filters are fixed according to block size, and the same filter is used for all predicted pixels, in all directional modes.

In HEVC, after the intra prediction block has been generated for VER and HOR intra modes, the left-most column and top-most row of the prediction samples are further adjusted, respectively. This can be further extended to several diagonal intra modes, and boundary samples up to four columns or rows are further adjusted using a two-tap (for intra mode 2 & 34) or a three-tap filter (for intra mode 3-6 & 30-33).

Figure 5:
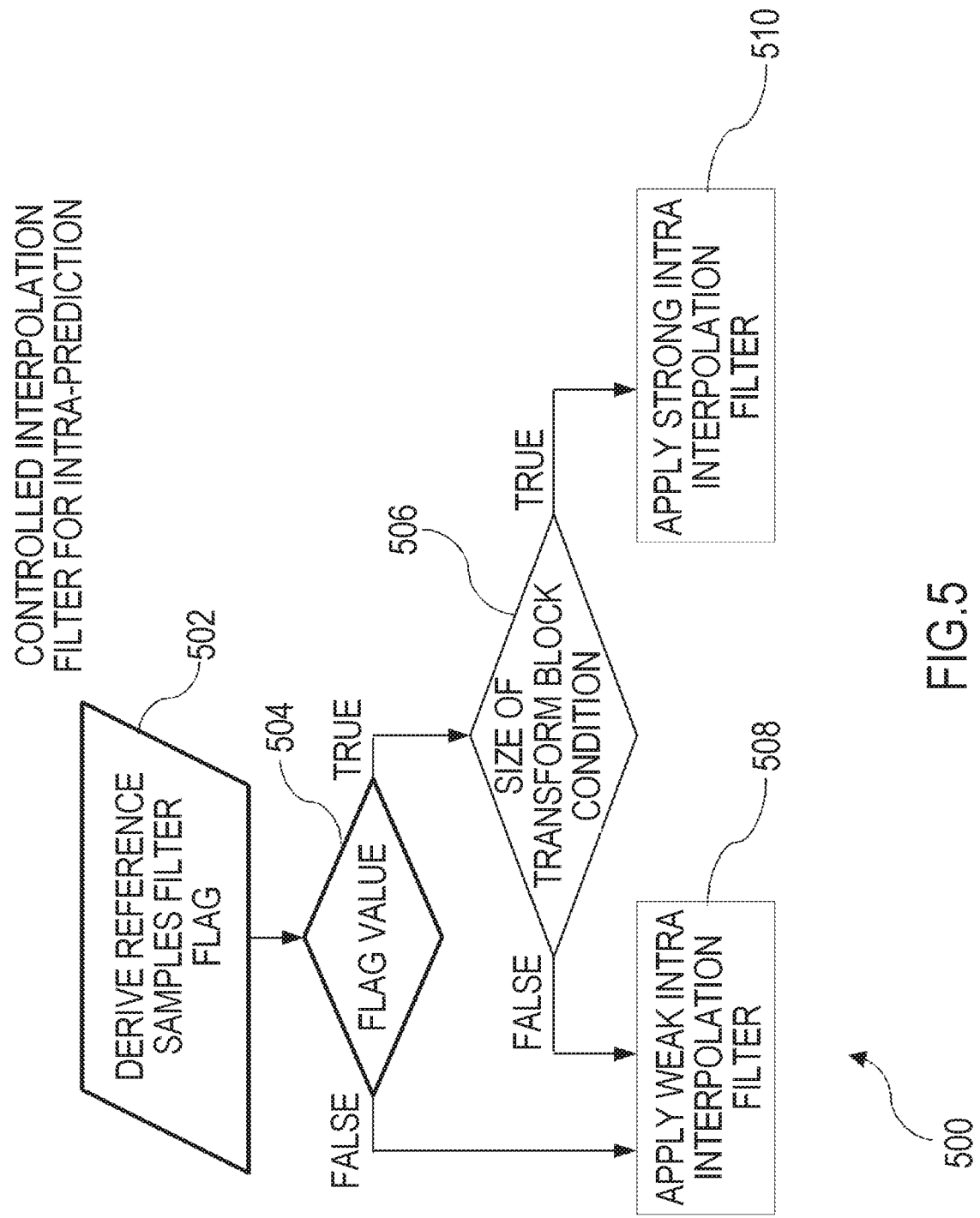
FIG. 5 is a flow chart of flow chart of a method for configuring a sequence of filters for intra-prediction in accordance with a further implementation of the present disclosure.

FIG. 4 and FIG. 5 illustrate two implementations for synchronizing a selection of an interpolation filter type with a reference samples filtering process. Both implementations consider that two interpolation filter types could be applied: weak and strong, e.g. Gaussian filter is used for 16×16 and larger predicted blocks and for other block sizes a Cubic filter is selected. For both implementations, an interpolation filter selection can be harmonized with a reference samples filtering process.

FIG. 5 is a flow chart of a method 500 for configuring an interpolation filter for intra-prediction.

The method 500 comprises a first step 502 of deriving a reference samples filter flag. In step 504, the reference samples filter flag is evaluated. If it is evaluated as true, the method continues in step 506 where a condition related to a size of a transform block is evaluated. If the condition is evaluated as false, the method continues in step 508, wherein a weak intra-interpolation filter is applied. Similarly, if the reference samples filter flag is evaluated as false in step 504, the method also continues in step 508. If the condition related to a size of a transform block is evaluated in step 506 as true, the method continues in step 510, wherein a strong intra-interpolation filter is applied.

The implementations of FIG. 4 and FIG. 5 have differences with respect to reference samples filter flag derivation. In the implementation of FIG. 4 the reference samples filter flag is true if the predicted block according to the condition has an option of different reference samples filter. This filter selection may be signaled explicitly or implicitly (i.e. by mapping to prediction mode or using data hiding in quantized residual data). For the implementation of FIG. 4 the actually selected reference filter value is not considered in reference samples filter flag derivation. But if reference samples filter selection is performed for the predicted block at the encoder side and the selection is signaled to the decoder explicitly or implicitly, the reference samples flag value is true. Otherwise, if a predicted block has a predefined reference filter or has no reference samples filtering the reference samples the flag value is false.

The implementation of FIG. 5 uses a value of a reference filter selection as a reference samples flag value. If a strong filter is selected for reference samples (such as {1 2 1}, or a 5-tap filter), a reference samples flag value is assigned to true. And similarly to the first implementation, reference samples flag value is false for predicted blocks that have no reference filtering or a weak reference samples filter was selected.

The beneficial effects of the above-described implementations are achieved by harmonization of reference samples filtering and intra-prediction interpolation processes. It can be observed that these implementations prevent predicted blocks from being too smooth.

Figure 6:
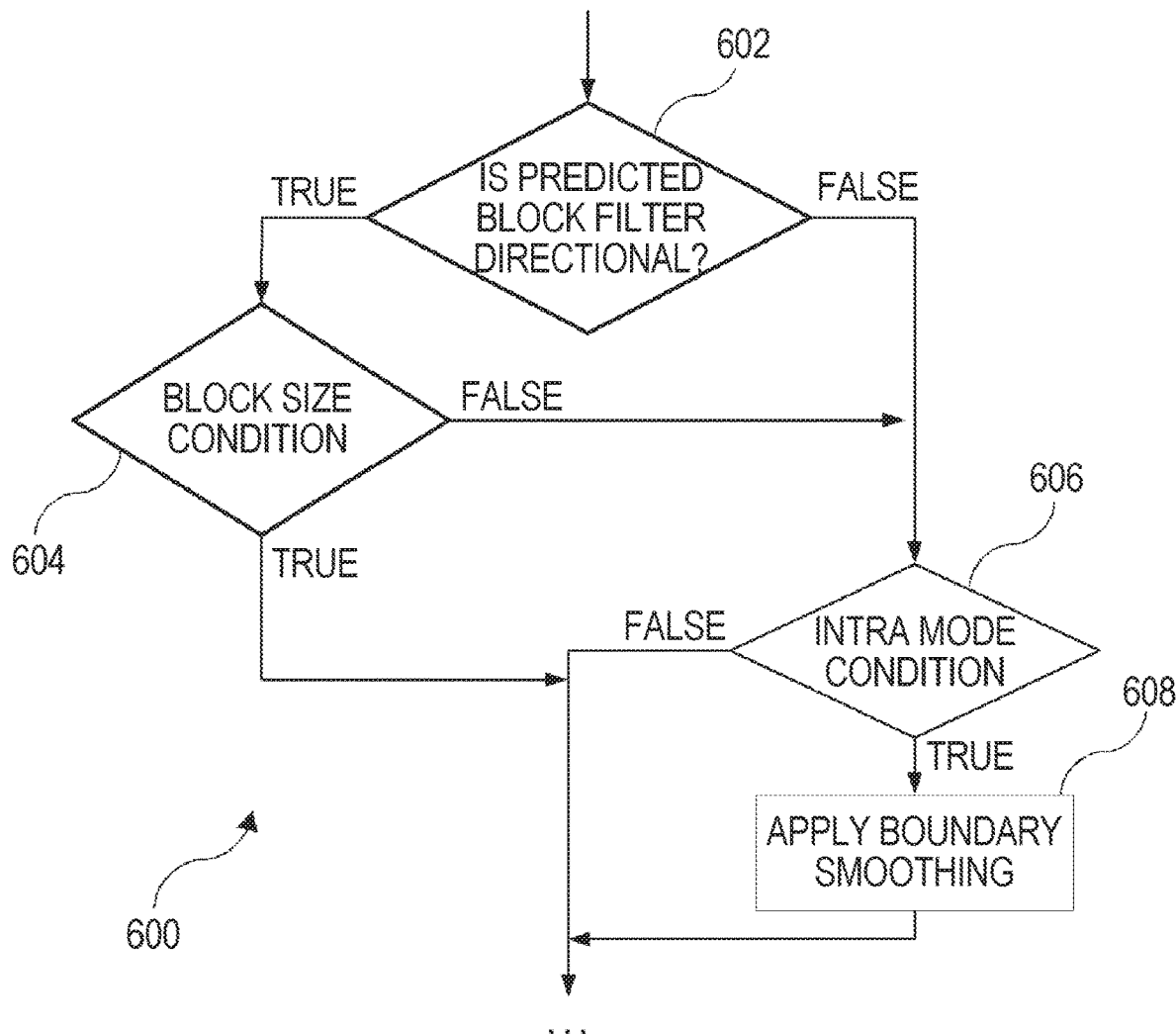
FIG. 6 is a flow chart of a method for configuring a sequence of filters for boundary smoothing in accordance with a further implementation of the present disclosure.

FIG. 6 is a flow chart of a method 600 for configuring a sequence of filters for boundary smoothing.

The method 600 comprises a first step 602 of determining if a predicted block filter is directional. If so, the method continues in step 604, wherein a block size condition is evaluated. If the block size condition is evaluated as false or the predicted block filter directionality is evaluated as false, the method continues in step 606, wherein an intra-mode condition is evaluated. If the intra-mode condition is evaluated as true, the method continues in step 608, wherein a boundary smoothing is applied. Otherwise, and if the block size condition in step 604 is evaluated as true, no boundary smoothing is applied.

Boundary smoothing can be applied if an intra prediction mode is selected to be DC, horizontal, vertical or diagonal one. The proposed disclosure synchronizes boundary smoothing with the selection of a filter for a predicted block. Specifically, the directionality of a predicted block filter is used to take the decision on whether to apply boundary smoothing or not. Directionality is a property of a spatial filter that indicates the difference in filtering strength between filtering directions. For example, if a two-dimensional filter has the same strength in both vertical and horizontal direction, this filter is non-directional. Particularly, for non-directional filters boundary smoothing is not applied. Multi-parameter intra-prediction can be an example of a predicted block filter. If this technique is used as a predicted block filter, the first condition in FIG. 6 could be formulated as "MPI index is greater than one".

For the opposite case when a predicted block filter is directional, the disclosure considers another constraint. If a size of a block being filtered is less than 32 pixels, boundary smoothing is skipped for this block despite of the directionality of the predicted block filter.

Figure 7:
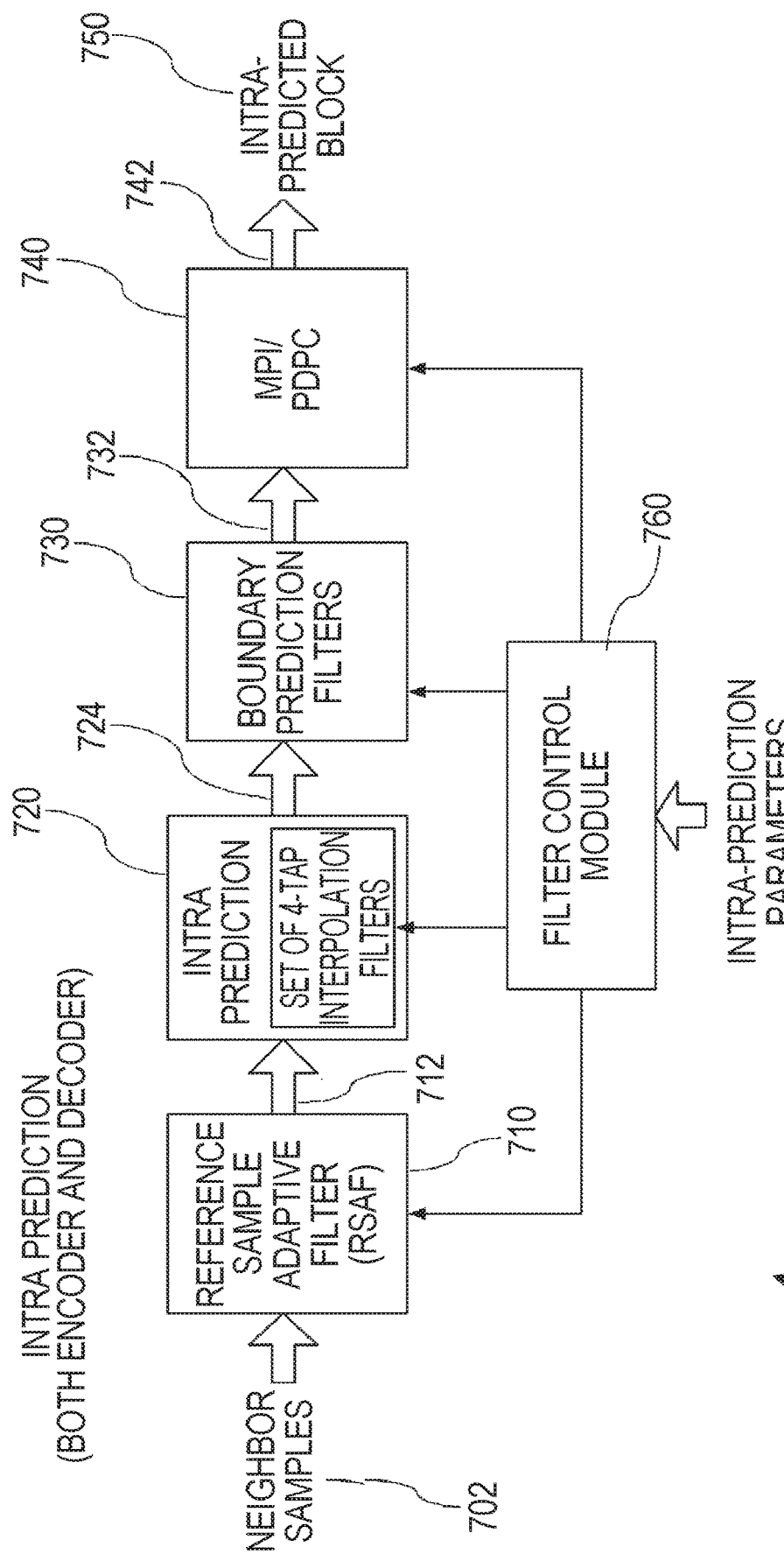
FIG. 7 is a structure scheme of a filter sequence for intra prediction in accordance with a further implementation of the present disclosure.

FIG. 7 is a structure scheme of a filter sequence 700 for intra prediction. The filter sequence 700 can be used for encoding or decoding a video.

The filter sequence 700 comprises a filter control module 760 that is configured to adjust parameters of several filters. In particular, the filter sequence 700 receives as input one or more neighbor samples 702. These neighbor samples 702 are provided as input to a reference sample adaptive filter, SAF, 710, which represents a first filter of the filter sequence 700. The reference sample adaptive filter 710 generates one or more reference samples 712, which are provided as an input to the intra-prediction unit 720. The intra-prediction unit 720 comprises a set of 4-tap interpolation filters 722, which are configurable by one or more interpolation filter parameters.

An output 724 of the intra-prediction unit is provided as input to the boundary prediction filters 730. An output 732 of the boundary prediction filters is provided as input to a multi-parameter intra-prediction/position-dependent intra-prediction combination unit 740. Unit 740 generates as output 742 one or more intra-predicted blocks 750.

The reference sample adaptive filter 710, the intra-prediction unit 720, the boundary prediction filters 730, and the multi-parameter intra-prediction/position-dependent intra-prediction combination unit 740 can each be configurable by one or more parameters, which can be set by the filter control module 760.

Multi-parameter intra prediction (MPI) is post-processing for intra-prediction which invokes additional smoothing with a decoded boundary. This can be implemented as $$P_{MPI}[i,j]=(\alpha P_{HEVC}[i,j]+\beta P_{MPI}[i-1,j]+\gamma P_{MPI}[i,j-1]+\delta P_{MPI}[i-1,j-1]+4)>>3$$

where outside of the block $P_{MPI}[i,j]$ is equal to reconstructed signal $$P_{MPI}[i,j]=REC[i,j] \text{ if } i<0||j<0.$$

The strength of this post-processing (parameters $\alpha+\beta+\gamma+\delta=8$) can be controlled on a CU level and signalled with up to 2 bits.

Position Dependent Intra Prediction Combination (PDPC), which can replace MPI, is a content adaptive post-processing for intra prediction that invokes combination of Intra prediction described above with un-filtered boundary. It can be implemented as follows:

$$\text{pred}(i,j)=(\alpha \cdot \text{temp}(i,j)+\beta \cdot \text{temp}(i-1,j)+\gamma \cdot \text{temp}(i,j-1)+4)>>3$$

Here (i,j) indicates sample location relatively to top-left corner, temp(i,j) is equal to Intra prediction described above for i≥0, j≥0 and equal to un-filtered reference for i=−1, j=−1.

The strength of this post-processing can be controlled by parameters $\alpha+\beta+\gamma=8$. Different sets of $\{\alpha, \beta, \gamma\}$ compose the dictionary summarized in Table 1. The strength of post-processing smoothing is different for blocks coded as 2N×2N and N×N. The same post-processing ban be applied for both luminance and chrominance blocks inside CU.

TABLE 1

Dictionary of post-processing parameters in combined intra prediction

| Combined Intra index | 2N × 2N Intra CU | | | N × N Intra CU | | | Effect |
|---|---|---|---|---|---|---|---|
| | α | β | γ | α | β | γ | |
| 0 | 8 | 0 | 0 | 8 | 0 | 0 | No post-processing |
| 1 | 4 | 2 | 2 | 6 | 1 | 1 | Smoothing left and above |
| 2 | 4 | 4 | 0 | 6 | 2 | 0 | Smoothing with above boundary |
| 3 | 4 | 0 | 4 | 6 | 0 | 2 | Smoothing with left boundary |

Combined Intra index which determines post-processing is signaled with 2 bits on a CU level. This syntax element is not signaled if left or top boundary of CU is picture boundary. Zero value of this index indicates that no post-processing is used.

If each tool has a flag to switch it on and off and the RDO procedure is performed not for each tool separately but jointly for all the tools that use smoothing, the problem of oversmoothing can be overcome. However, this solution can have a disadvantage of redundant signaling that can decrease an overall coding performance.

Figure 8:
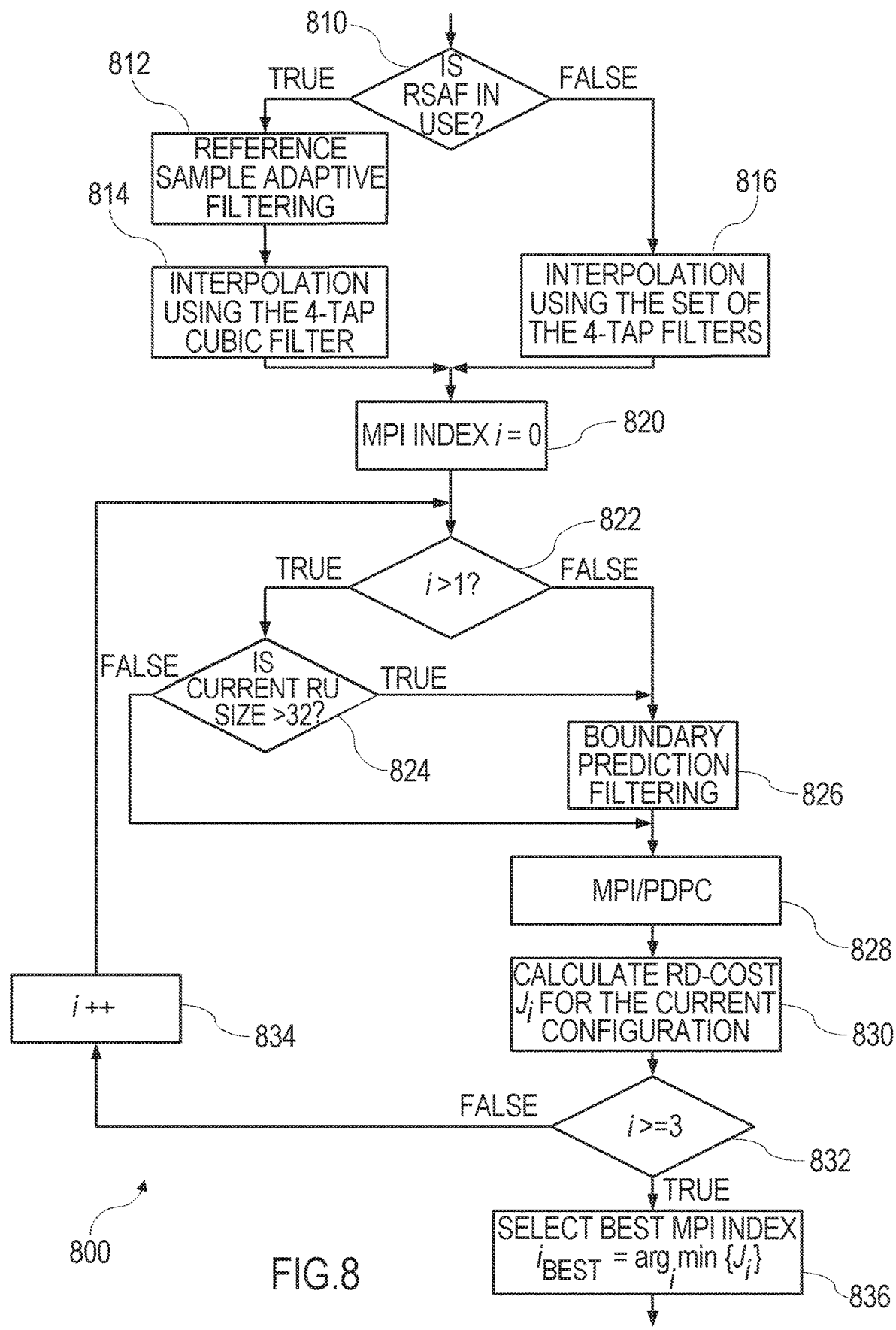
FIG. 8 is a flow-chart of a method for configuring a filter sequence for intra-prediction in accordance with a further implementation of the present disclosure.

FIG. 8 is a flow-chart of a method 800 for configuring a filter sequence for intra-prediction.

The method 800 comprises a first step 810 of determining whether reference sample adaptive filtering, RSAF, is in use. For example, this can be determined by evaluating a RASF flag. If it is determined that RSAF is in use, in step 812 reference sample adaptive filtering is applied. Subsequently, in step 814, interpolation using 4-tap cubic filter is applied. This can be achieved by setting an interpolation mode parameter of an interpolation filter of the filter sequence for intra-prediction to 4-tap cubic filter.

If it is determined in step 810 that RSAF is not in use, in step 816, interpolation using a set of 4-tap filters is applied. In particular, this can be a predetermined set of 4-tap filters. Setting the interpolation filter to use the set of 4-tap filters can be achieved e.g. by setting a interpolation parameter of the interpolation filter to "set of 4-tap filters".

In a further step 820, an MPI index variable i is set to 0. Subsequently, in step 822, it is determined whether the variable is larger than 1. If so, in step 824 it is determined whether a current prediction unit, PU, size is larger than 32. If so, in step 826, boundary prediction filtering is applied. Boundary prediction filtering is also applied if in step 822 it is determined that i is not larger than 1. If in step 824 it is determined that the current PU size is not larger than 32, the method continues in step 828 with multi-parameter intra-prediction/position-dependent intra-prediction combination.

Subsequently, in step 830, a rate distortion cost, RD-cost $J_i$ for the current configuration is calculated. In particular, the current configuration can correspond to the current value of the MPI index i. In other implementations, also other parameters are varied and an RD-cost for the different parameter settings can be determined.

In step 832 it is determined whether the MPI index i is larger than equal to 3. If not, the MPI index is increased by 1 in step 834 and the method continues in step 822. If the MPI index is larger to or equal 3, the method continues in step 836 by selecting a best MPI index. This can be achieved by choosing the MPI index which corresponds to the lowest RD-cost $J_i$.

Figure 9:
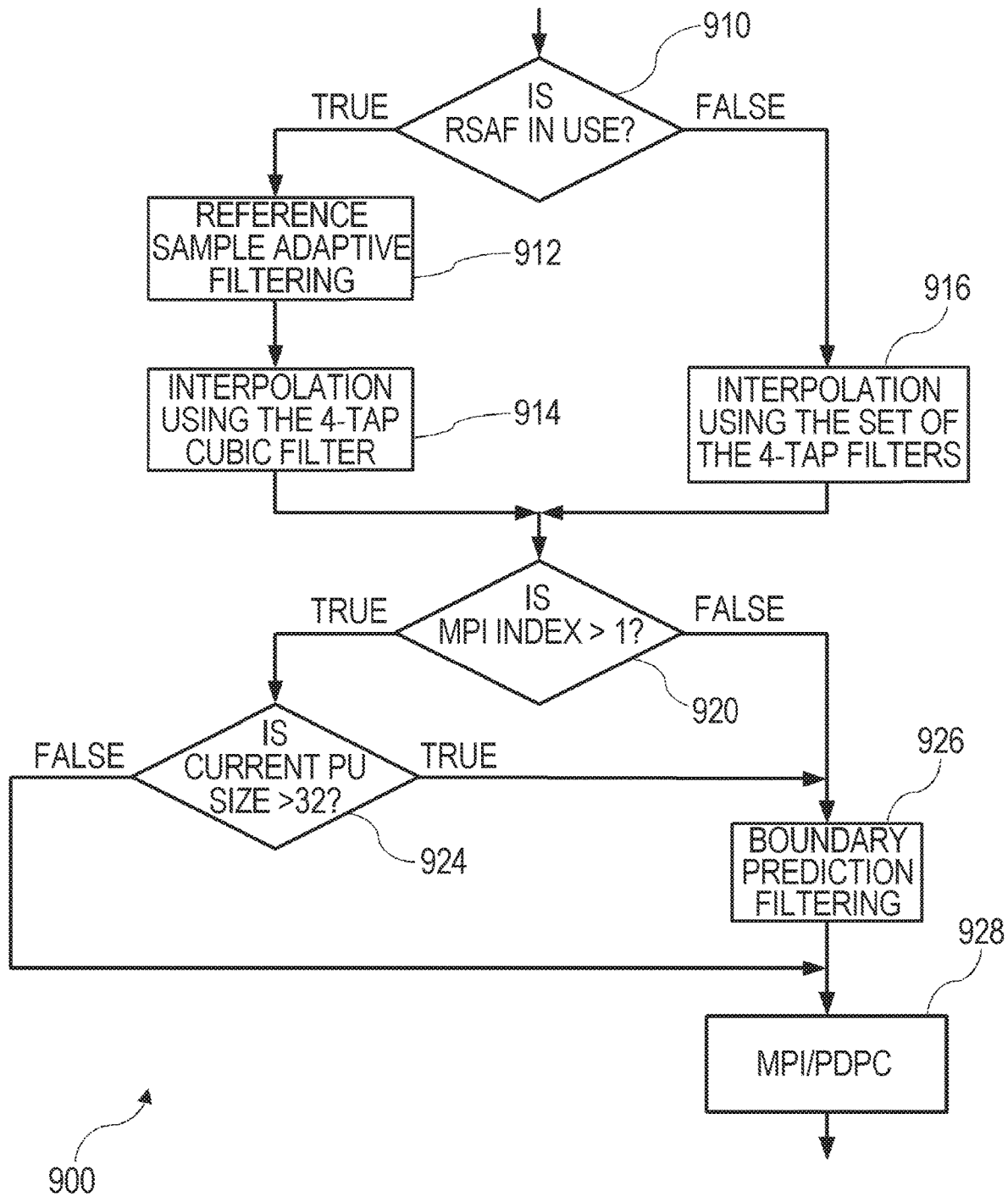
FIG. 9 is a flow chart of a method for intra-prediction with a filter control module at the decoder side in accordance with a further implementation of the present disclosure.

FIG. 9 is a flow chart of a method 900 for configuring a sequence of filters for intra-prediction with a filter control module at the decoder side.

An inter-prediction mechanism may comprise for example the following filters:
 a regular filter based on Lagrangian interpolation,
 a sharpening filter used DCT-based interpolation (mostly around sharper edges), and/or
 a smoothing non-interpolating filter.

For example, just one of the filters can be selected. For quarter-pel interpolation, a sharpening filter can be enabled by default, i.e. its parameters should be retrieved by parsing a bit-stream at the decoder side without deriving any other flags and parameters. For half-pel interpolation, sharpening can be turned off. For int-pel, both sharpening and smoothing filters are enabled and, hence, can be switched off if needed. However, if one of them is turned on, its parameters should be retrieved from a bit-stream before performing filtering.

The method 900 comprises a first step 910 of determining whether reference sample adaptive filtering, RSAF, is in use. For example, this can be determined by evaluating a RASF flag. If it is determined that RSAF is in use, in step 912 reference sample adaptive filtering is applied. Subsequently, in step 914, interpolation using 4-tap cubic filter is applied. This can be achieved by setting an interpolation mode parameter of an interpolation filter of the filter sequence for intra-prediction to 4-tap cubic filter.

If it is determined in step 910 that RSAF is not in use, in step 916, interpolation using a set of 4-tap filters is applied. In particular, this can be a predetermined set of 4-tap filters. Setting the interpolation filter to use the set of 4-tap filters can be achieved e.g. by setting a interpolation parameter of the interpolation filter to "set of 4-tap filters".

In step 920, it is determined whether the MPI index is larger than 1. The MPI index can have been determined e.g. by parsing or otherwise determining the MPI index value from a bitstream. If the MPI index is larger than 1 the method continues in step 924 by evaluating whether a current PU size is larger than 32. If so, and if the MPI index is not larger than 1, the method continues in step 926 by applying boundary prediction filtering. If, however, the current PU size is not larger than 32, the method continues in step 928 with multi-parameter intra-prediction/position-dependent intra-prediction combination.

Figure 10:
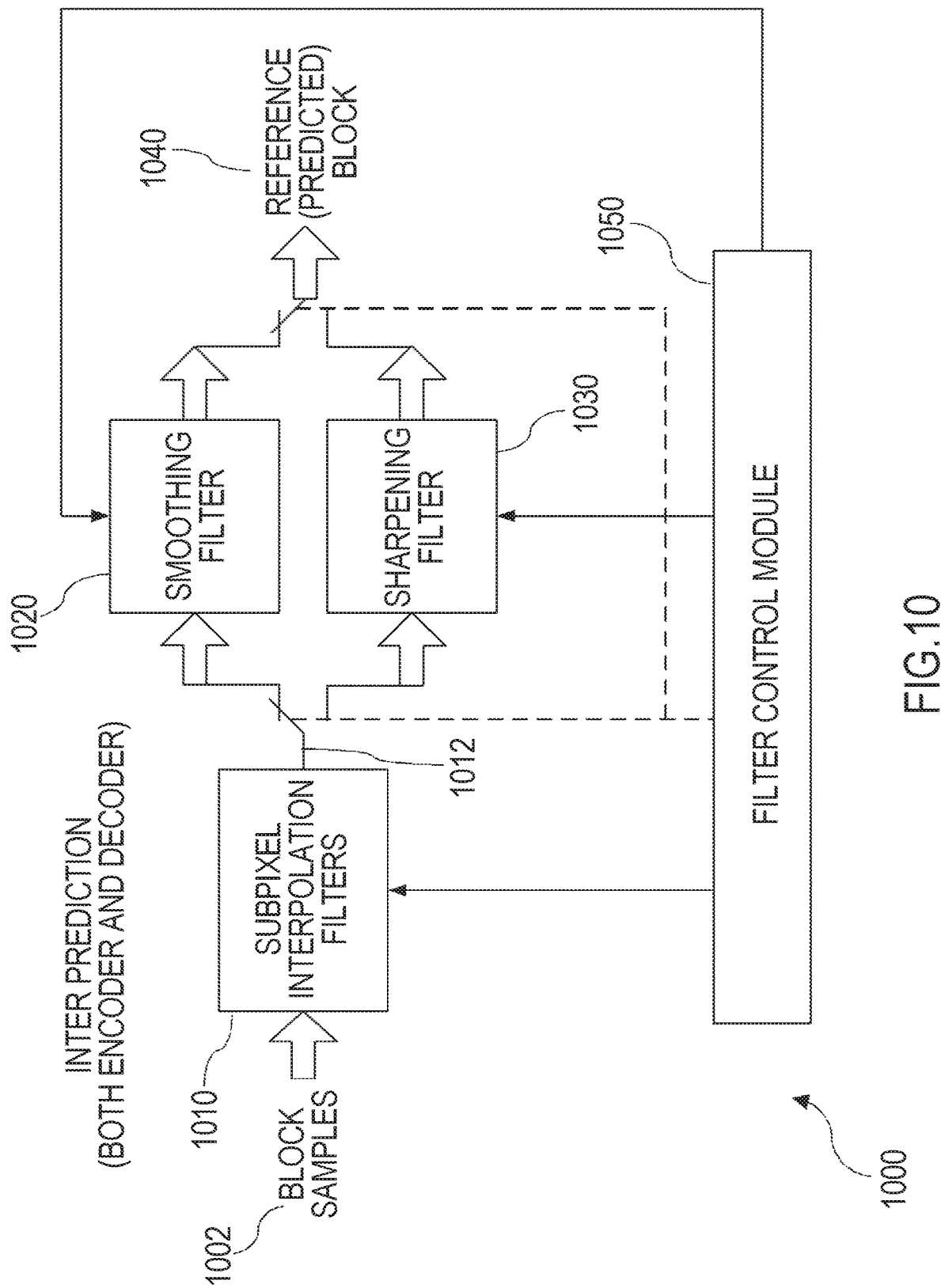
FIG. 10 is a structure scheme of a serial-parallel implementation of inter-prediction with a filter control module in accordance with a further implementation of the present disclosure.

FIG. 10 is a structure scheme of a sequence of filters 1000, wherein the sequence 1000 has a serial/parallel structure.

The sequence of filters 1000 is configured to process a block of samples 1002 to obtain a reference (predicted) block 1040. The sequence 1000 comprises one or more sub-pixel interpolation filters 1010 which are configured to interpolate between the block samples 1002. A result 1012 of the sub-pixel interpolation is provided as input to a smoothing filter 1020 and/or a sharpening filter 1030. For example, either the smoothing filter 1020 or the sharpening filter 1030 is used.

The output of the smoothing filter 1020 and/or the sharpening 1030 is a reference (predicted) block 1040. The filter sequence 1000 is controlled by a filter control module 1050 which is configured to set parameters of the sub-pixel interpolation filters 1010, the smoothing filter 1020 and/or the sharpening filter 1030.

Figure 11:
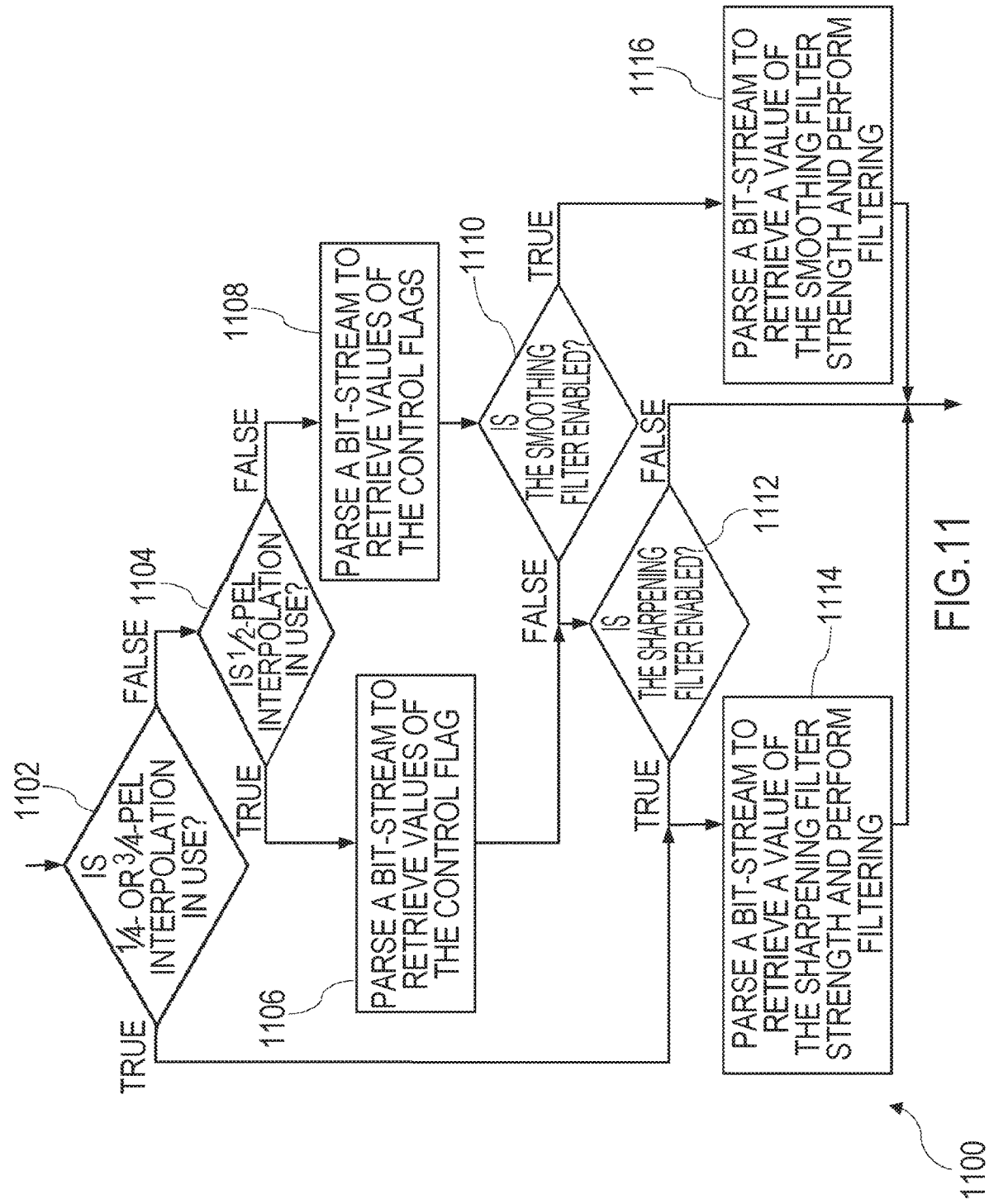
FIG. 11 is a flow chart of a method for configuring a sequence of filters for inter-prediction with a filter control module at the decoder side in accordance with a further implementation of the present disclosure.

FIG. 11 is a flow chart of a method for configuring a sequence of filters for inter-prediction with a filter control module at the decoder side.

The method 1100 comprises a first step of determining whether ¼-¾-PEL interpolation is in use. If this is not the case, the method continues in step 1104 by determining whether ½-PEL interpolation is in use. If so, the method continues in step 1106 by parsing a bitstream to retrieve one or more values of a control flag. Subsequently, in step 1112, it is determined whether a sharpening filter is enabled. In particular, this can be determined from the one or more values of the control flag determined in step 1106. Alternatively, if in step 1104, it has been determined that ½-PEL interpolation is not in use, the method continues in step 1108 with parsing a bitstream to retrieve one or more values of one or more control flags. Subsequently, in step 1110, it is determined whether a smoothing filter is enabled. In particular, this can be determined from the one or more values of the one or more control flags.

If a smoothing filter is enabled, the method continues in step 1116, wherein a bitstream is parsed to retrieve one or more values of a smoothing filter strength parameter and filtering is performed accordingly. Alternatively, if in step 1110 it is determined, e.g. from the bitstream, that the smoothing filter is not enabled, the method continues in step 1112, wherein it is determined whether the sharpening filter is enabled. If the sharpening filter is enabled, the method continues in step 1114, wherein the bitstream is parsed to retrieve one or more values of the sharpening filter strength parameter, and filtering is performed accordingly.

State-of-the-art video coding also provides filtering steps at the final stage of encoder and decoder. This filtering is referred to as in-loop filtering, as soon as the output data of this processing is passed to the motion-compensation loop.

Some sequences of filters can be used both at an encoder and at a decoder. For example, a first stage of the sequence of filters is configured to remove blocking artifacts by using deblocking filter. Low-pass filters are applied to edges of TUs in accordance with a set of pre-defined rules. These rules have parameters referred to as deblocking parameters that could be specified for the whole sequence or for each frame separately.

For example, a second stage is configured to remove quantization noise by usage of sample adaptive offset. A frame can be subdivided into pixel areas with SAO parameters assigned to each of these areas. The SAO parameters can comprise:

SAO type that controls classifier type:
  BO (band offset): this SAO type selects to add offsets to pixels that have values in the range specified by SAO category
  EO (edge offset): this SAO type selects to add different offsets to pixels depending on SAO category
SAO class: Specifies pattern of pixels that should be used to derive SAO category
SAO offsets: a look-up table that assigns each SAO category with and offset. According to the pixel category a corresponding offset should be added.

For example, one or more of these SAO parameters are derived at the encoded side and are encoded to the bitstream, so that the decoder can parse them.

The next stage is to apply adaptive loop filter (ALF) which is rather close to Wiener filter. At the encoder side such filter coefficients are derived that provide minimal mean squared error after filtering reconstructed pixels. These coefficients are further quantized and signaled to the decoder in the bitstream.

For example, a filter control module to match filter strength at different stages of the in-loop filtering chain is configured to adjust processing at a filtering stage in accordance with the values of parameters at the other stage(s).

Figure 12:
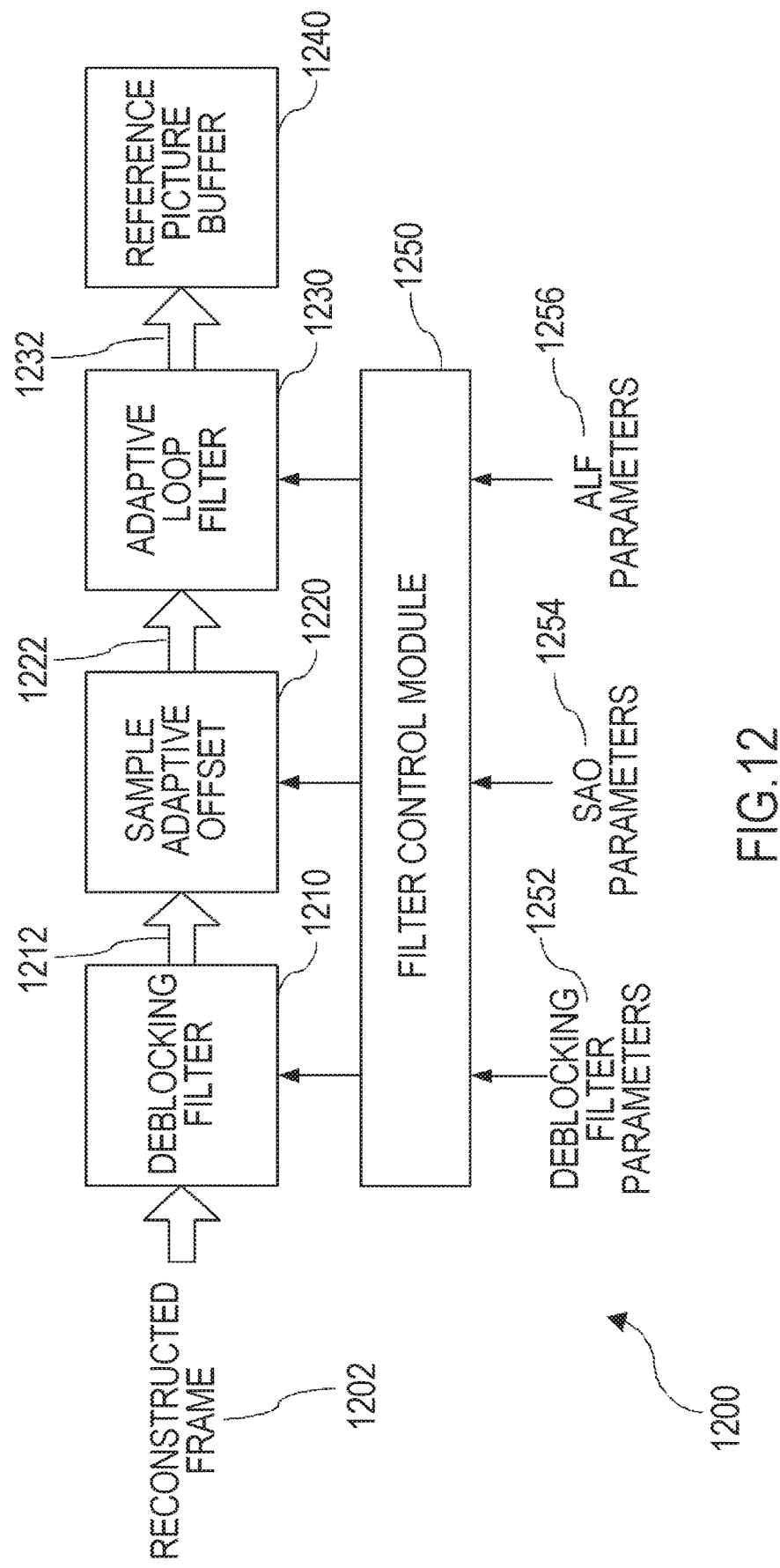
FIG. 12 is as structure scheme of a an in-loop filter chain in accordance with a further implementation of the present disclosure.

FIG. 12 is as structure scheme of an in-loop filter chain 1200, which is a sequence of filters.

The in-loop filter chain 1200 is configured to process a reconstructed frame 1202 to obtain a reference picture buffer 1240. The reconstructed frame 1202 is provided as input to the deblocking filter 1210. An output of the deblocking filter is provided as input 1212 to a sample adaptive offset filter 1220. An output of the sample adaptive offset filter 1220 is provided as input 1222 to an adaptive loop filter 1230. An output of the adaptive look filter 1230 is provided as input 1232 of the reference picture 1240.

The deblocking filter 1210, the sample adaptive offset filter 1220 and the adaptive loop filter 1230 are configurable with parameters that can be set by the filter control module 1250. The filter control module 1250 is configured to determine these parameters based on input parameters, which include one or more deblocking filter parameters 1252, one or more SAO parameters 1254 and one or more ALF parameters 1256. For example, these parameters can be user-defined or obtained from a bitstream.

The deblocking filter 1210 may depend on one or more SAO parameters. For example, at the encoder side, if SAO type is selected to be EO (edge offset) and pixel pattern (SAO class) is aligned to horizontal or vertical direction, deblocking operation is disabled for edges that have direction orthogonal to the selected pixel pattern direction.

Figure 13:
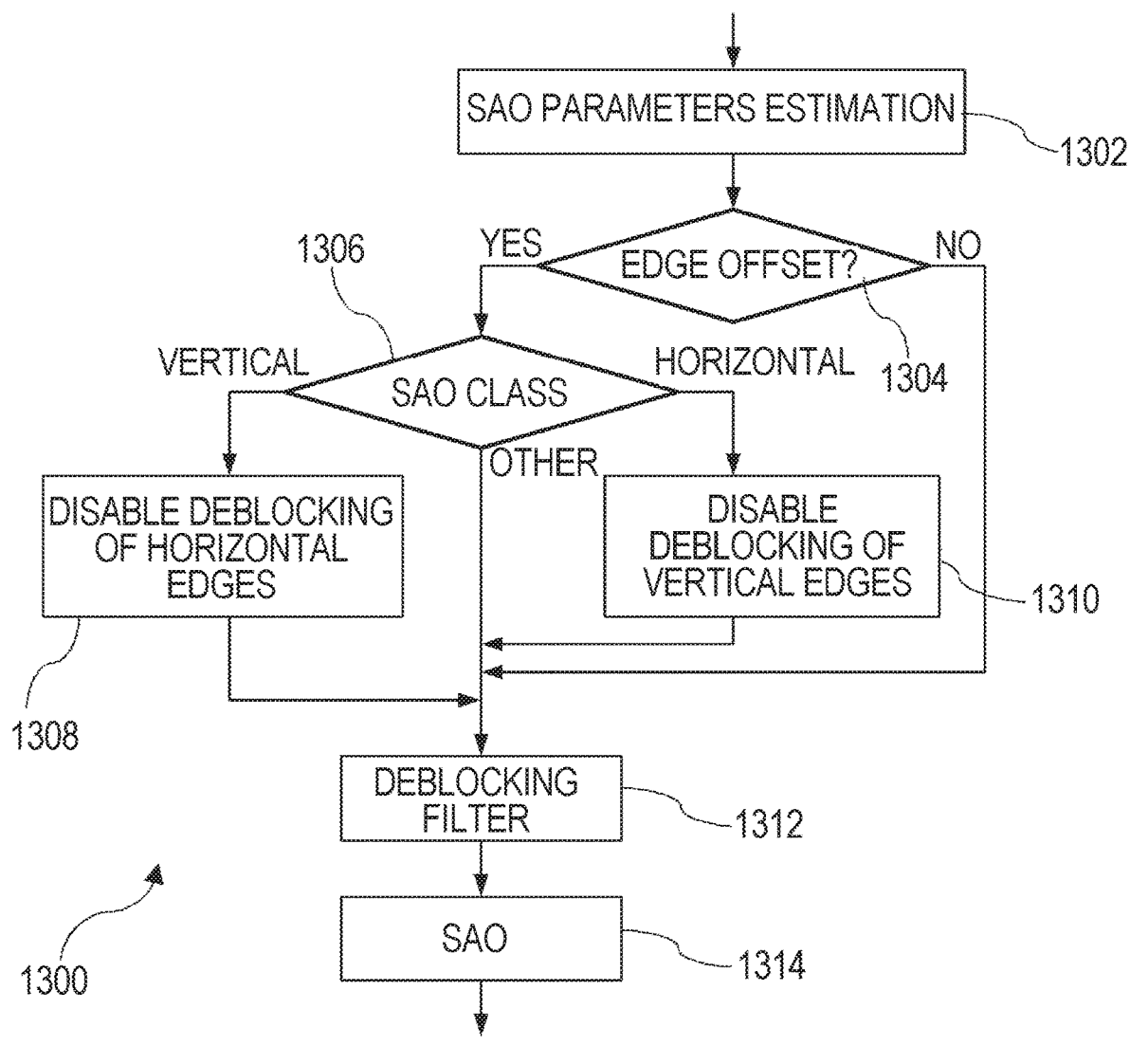
FIG. 13 is a flow chart of a method for configuring a sequence of filters, wherein deblocking filtering depends on one or more SAO parameters, in accordance with a further implementation of the present disclosure.

FIG. 13 is a flow chart of a method 1300 for configuring a sequence of filters, wherein deblocking filtering depends on one or more SAO parameters.

The method 1300 comprises a first step 1302 of estimating one or more SAO parameters. The SAO parameters can include an edge offset parameter and a SAO class.

In step 1304 it is determined whether the edge offset parameter is set to true. If so, in step 1306 the SAO class parameter is evaluated. If the SAO class parameter is set to vertical, the method in step 1308 disables deblocking of horizontal edges. If the SAO class parameter is set to horizontal, in step 1310, deblocking of vertical edges is disabled. If the SAO class is set to another value, or if in step 1304 the edge offset parameter is determined to be false, the method continues in step 1312 of applying the deblocking filter according to the above-determined configuration. Subsequently the method continues in step 1314 with sample-adaptive offset filtering and possibly further filtering steps.

Figure 14:
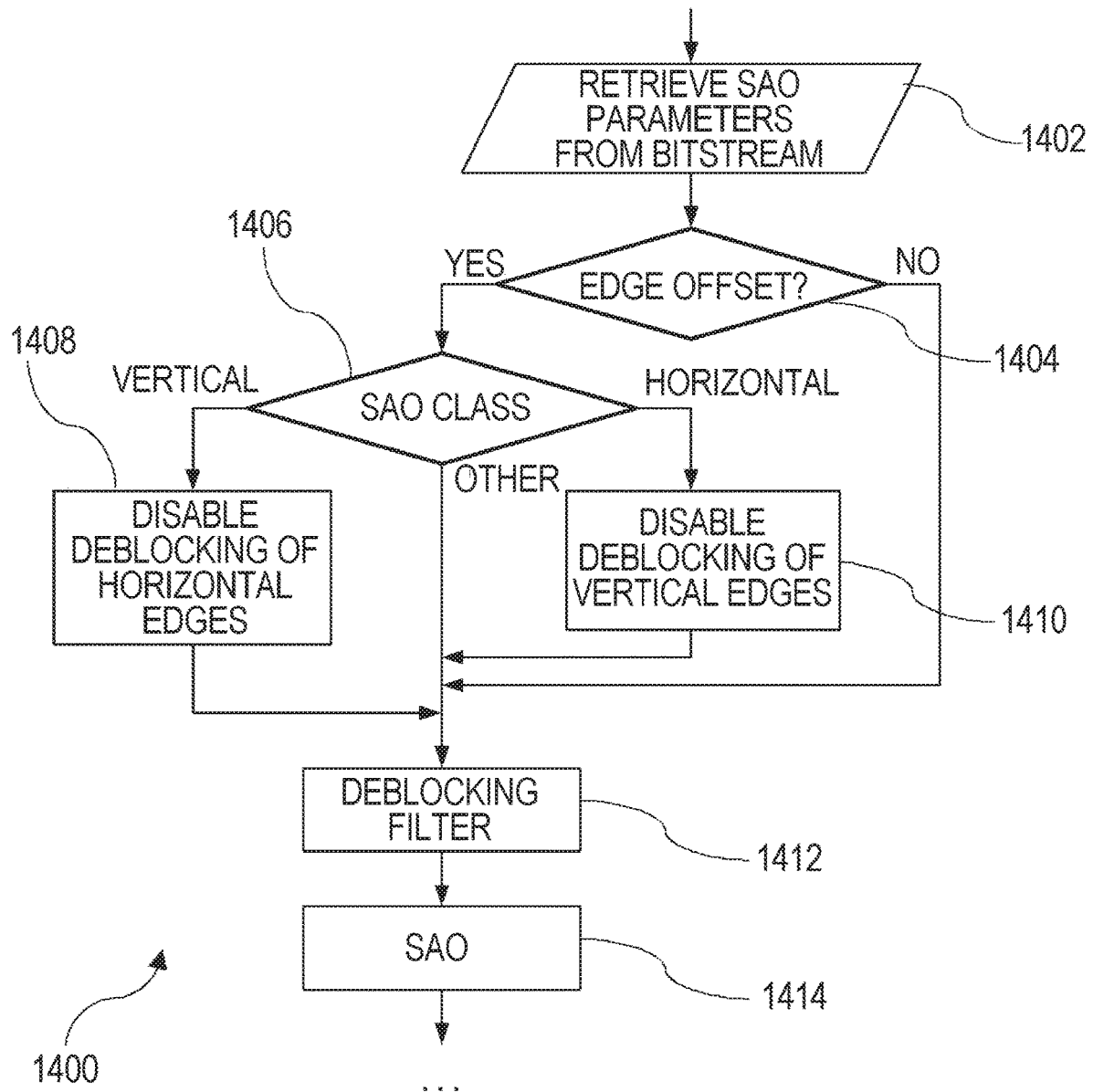
FIG. 14 is a flow chart of a further method for configuring a sequence of filters, wherein deblocking filtering depends on SAO parameters and wherein the filtering occurs at a decoder side, in accordance with a further implementation of the present disclosure.

FIG. 14 is a flow chart of a further method 1400 for configuring a sequence of filters, wherein deblocking filtering depends on SAO parameters and wherein the filtering occurs at a decoder side.

In a first step 1402, one or more SAO parameters are retrieved from a bitstream.

In step 1404 it is determined whether the edge offset parameter is set to true. If so, in step 1406 the SAO class parameter is evaluated. If the SAO class parameter is set to vertical, the method in step 1408 disables deblocking of horizontal edges. If the SAO class parameter is set to horizontal, in step 1410, deblocking of vertical edges is disabled. If the SAO class is set to another value, or if in step 1404 the edge offset parameter is determined to be false, the method continues in step 1412 of applying the deblocking filter according to the above-determined configuration. Subsequently the method continues in step 1414 with sample-adaptive offset filtering and possibly further filtering steps.

Figure 15:
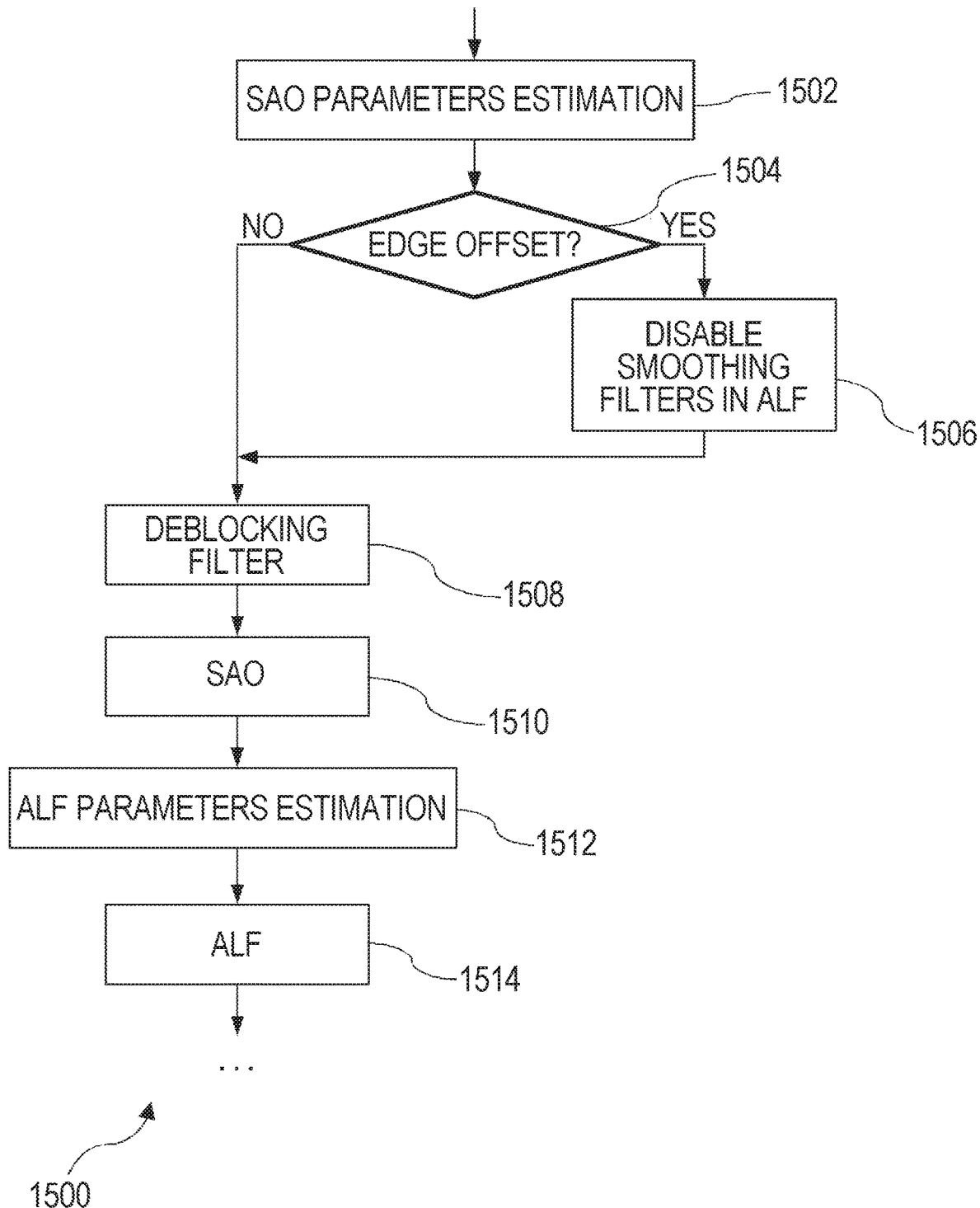
FIG. 15 is a flow chart of a method for configuring a sequence of filters, wherein the method adjusts one or more ALF parameters in accordance with one or more SAO parameters at a decoder side, in accordance with a further implementation of the present disclosure, and FIG. 16 a flow chart of a configuring a sequence of filters, wherein the method adjusts one or more ALF parameters in accordance with one or more SAO parameters at a decoder side, in accordance with a further implementation of the present disclosure.

FIG. 15 is a flow chart of a method 1500 for configuring a sequence of filters, wherein the method 1500 adjusts one or more adaptive loop filter parameters in accordance with one or more SAO parameters at a decoder side.

In particular, the method 1500 comprises a first step 1502 of estimating SAO parameters. In a second step 1504, it is determined whether an edge offset flag is set. If it is set, in step 1506, smoothing filters in the adaptive-loop filter, ALF, is disabled.

Subsequently, in steps 1508 to 1514, deblocking, sample adaptive offset filtering, adaptive loop filter parameter estimation, and the adaptive loop filtering are applied.

Compared to the methods illustrated e.g. in FIG. 13 and FIG. 14, the codebook selection to encode and decode ALF parameters is different in particular for edge offset and band offset SAO cases.

Figure 16:
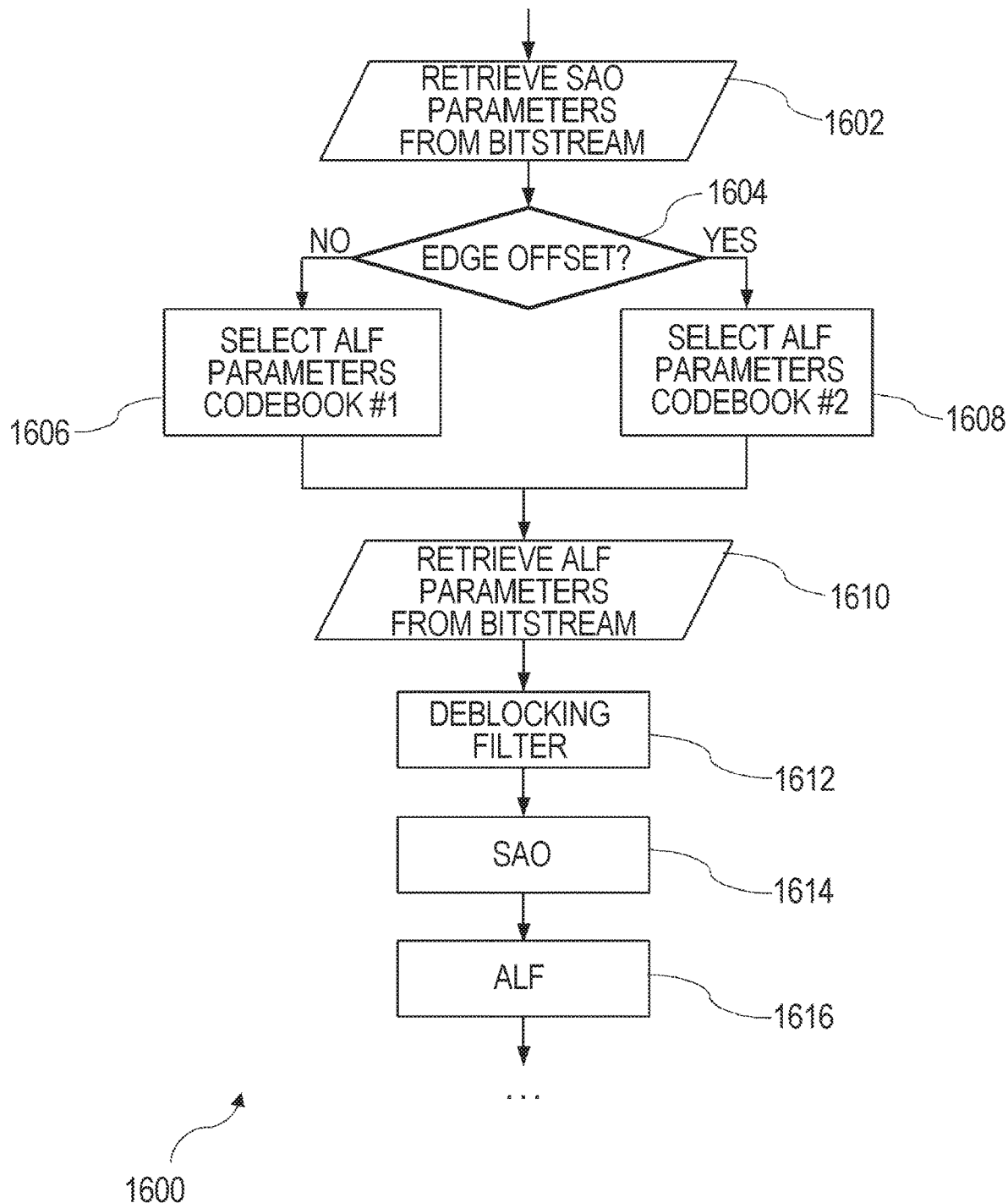

FIG. 16 is a flow chart of a method 1600 for adjusting one or more ALF parameters in accordance with one or more SAO parameters at an encoder side.

In a first step 1602, SAO parameters are derived from a bitstream. In a second step 1604, it is determined whether an edge offset flag is set. If it is not set, in step 1606 a first ALF parameter codebook is selected. If the edge offset flag is not set, in step 1608, a second ALF parameter codebook is selected.

Subsequently, in steps 1610 to 1616, ALF parameters are retrieved from a bitstream, a deblocking filter is applied, sample adaptive offset filtering is applied, and the adaptive-loop filtering is applied.

Implementations of the disclosure can relate to the following further aspects:
1. A method of encoding and decoding video data, comprising intra prediction process that consists in
   a. Configuring filter parameters of the steps given below in accordance with intra-prediction parameters
   b. Preparing reference samples by adaptively applying filter to the neighboring samples of the block being predicted.
   c. Calculating predicted value for each sample of the block being predicted using interpolated values of reference samples
   d. Applying filter to the predicted block
   e. Perform boundary smoothing
2. A method of aspect 1, where quad-tree partitioning results are used as an indication of reference samples filter selection using explicit or implicit signaling.
3. A method of aspect 1, where calculating predicted value for each sample of the block being predicted is performed using interpolation filter which is selected in accordance with reference samples filtering process.
4. A method of aspect 3, where interpolation filter selection is performed for the blocks being predicted that were calculated without implicit or explicit signaling of reference samples filter selection.
5. A method of aspect 3, where interpolation filter selection is performed for the blocks being predicted that were obtained from the reference samples filtered by weak reference sample filter.
6. A method of aspect 1, where boundary smoothing is performed for TUs that belong to PUs that meet size constraint.
7. A Method of aspect 6, where predicted block filter directionality affects the decision of applying boundary smoothing.
8. A method of encoding and decoding video data, comprising inter-prediction process that consists in
   a. Configuring filter parameters of the steps given below in accordance with inter-prediction parameters
   b. Preparing reference samples by adaptively applying filter to the search area used to look for such a block that will be used as a reference after processing with interpolation and prediction filters.
   c. Applying an interpolation filter to the block that is currently processed
   d. Applying prediction filters to the block that is currently processed.
9. A method of aspect 8, where step d precedes step c.
10. A method of filtering a signal comprising
    a. several iterative filtering steps, where filter strength depends on additional conditions,
    b. indication associated with some of the filtering steps, that specify filtering strength at the associated step, and
    c. control unit that overrides additional conditions at filtering steps a depending on the indication associated with the preceding steps
11. A method of aspect 10, where indication of a strong filter at filtering step i overrides additional conditions check at steps k>i to select weaker filter Implementations of the present disclosure provide one or more of the following advantages:
Many potential applications in hybrid video coding framework that are compatible with JEM that is the foundation for a next-generation video coding standard;
Reduced BD-rate and subjective quality improvements in comparison with JEM1.
Reduced the computational complexity of both encoder and decoder as compared to JEM1 with integrated RSAF, which makes the disclosure to be potentially attractive for many mobile applications;
Avoiding redundant signaling (syntax).

The foregoing descriptions are only implementation manners of the present disclosure, the scope of the present disclosure is not limited to this. Any variations or replacements can be easily made through person skilled in the art. Therefore, the protection scope of the present disclosure should be subject to the protection scope of the attached claims.

What is claimed is:
1. A video coding device, comprising:
a sequence of filters that are configurable based on one or more primary parameters and one or more secondary parameters,
wherein the sequence of filters comprises one or more primary filters that are configurable based on the one or more primary parameters and one or more secondary filters that are configurable based on the one or more secondary parameters, wherein the one or more primary filters are located in the sequence of filters before the one or more secondary filters,
wherein the sequence of filters comprises:
a reference sample filter as a primary filter and configured to adaptively filter one or more neighbouring samples of a current video block to obtain one or more reference samples; and
an interpolation filter as a secondary filter and configured to predict one or more samples of the current video block using an interpolation of the one or more reference samples,
wherein the one or more primary parameters comprise a reference sample filter flag of the reference sample filter and the one or more secondary parameters comprise a filter strength parameter of the interpolation filter,
wherein the reference sample filter flag indicates whether the reference sample filter is applied and the filter strength parameter indicates whether a weak or strong interpolation filter is applied, wherein the interpolation filter is configured to use the interpolation according to the filter strength parameter, and wherein the video coding device further comprises a filter controller configured to determine the filter strength parameter based on the reference sample filter flag.

2. The video coding device of claim 1, wherein the filter controller is further configured to determine the filter strength parameter based on a strength criterion of the sequence of filters, wherein the strength criterion comprises at least one of:

a smoothness criterion, a ratio of an amplification factor for a high-frequency domain and an amplification factor for a low-frequency domain, and a ratio of a contrast value before filtering and a contrast value after filtering.

3. The video coding device of claim 1, wherein the one or more primary parameters are predetermined parameters, wherein the predetermined parameters are predetermined from at least one of an encoded bitstream, a user setting and a parameter search loop at an encoding device.

4. The video coding device of claim 1, wherein the sequence of filters comprises a boundary smoothing filter which is configured to perform boundary smoothing for one or more transform units that belong to one or more prediction units that meet a size constraint.

5. The video coding device of claim 1, wherein the one or more primary parameters includes a direction parameter of a predicted block filter and the one or more secondary parameters include an on-off parameter of a boundary smoothing filter.

6. The video coding device of claim 1, wherein the sequence of filters further comprises an adaptive loop filter configured to use a selected codebook to indicate one or more filter coefficients in a bitstream, and wherein the filter controller is configured to select the codebook out of a plurality of codebooks based on the one or more primary parameters.

7. The video coding device of claim 1, wherein the sequence of filters comprises:

a deblocking filter configured to process vertical edges based on a vertical filter strength parameter and horizontal edges based on a horizontal filter strength parameter;

a sample adaptive offset (SAO) filter configured to classify pixels and add offset values to the pixels in accordance with a SAO class parameter; and an adaptive loop filter configured to use two or more codebooks to indicate one or more filter coefficients in a bitstream, wherein the one or more primary parameters comprise the SAO class parameter and a SAO type parameter of the SAO filter and the one or more secondary parameters comprise the horizontal filter strength parameter and the vertical strength parameter, wherein the filter controller is configured to derive the secondary parameters based on the SAP class parameter and/or the SAO type parameter of the SAO filter, and wherein the filter controller is configured to select the two or more codebooks based on the SAO type parameter.

8. The video coding device of claim 1, wherein the filter strength parameter is a flag for selecting whether the weak or strong interpolation filter is applied.

9. The video coding device of claim 1, wherein the filter strength parameter indicates whether to use a Gaussian filter or a Cubic filter as the interpolation filter.

10. The video coding device of claim 1, wherein the filter controller is configured to determine the filter strength parameter further based on a transform block size.

11. A method for configuring a sequence of filters for video coding, the method comprising:

configuring the sequence of filters with one or more primary parameters and one or more secondary parameters, wherein the sequence of filters comprises one or more primary filters that are configurable based on the one or more primary parameters and one or more secondary filters that are configurable based on the one or more secondary parameters, wherein the one or more primary filters are located in the sequence of filters before the one or more secondary filters, wherein the sequence of filters comprises:

a reference sample filter as a primary filter and configured to adaptively filter one or more neighbouring samples of a current video block to obtain one or more reference samples; and an interpolation filter as a secondary filter and configured to predict one or more samples of the current video block using an interpolation of the one or more reference samples, wherein the one or more primary parameters comprise a reference sample filter flag of the reference sample filter and the one or more secondary parameters comprise a filter strength parameter of the interpolation filter, wherein the reference sample filter flag indicates whether the reference sample filter is applied and the filter strength parameter indicates whether a weak or strong interpolation filter is applied, and wherein the method further comprises:

determining the filter strength parameter based on the reference sample filter flag, and configuring the interpolation filter to use the interpolation according to the filter strength parameter.

12. The method of claim 11, further comprising an initial step of determining the one or more primary parameters from a bitstream.

13. A non-transitory computer-readable storage medium having stored thereon a program code, the program code comprising instructions for carrying out the method of claim 11, when executed on a computer.

14. A non-transitory computer-readable storage medium having stored thereon a program code, the program code comprising instructions for carrying out the method of claim 12, when executed on a computer.

15. A video coding device, comprising:

a sequence of filters that are configurable by one or more primary parameters and one or more secondary parameters; and a filter controller configured to adjust the one or more secondary parameters based on the one or more primary parameters and based on a strength criterion of the sequence of filters, wherein the sequence of filters comprises:

a deblocking filter configured to process vertical edges based on a vertical filter strength parameter and horizontal edges based on a horizontal filter strength parameter;

a sample adaptive offset (SAO) filter configured to classify pixels and add offset values to the pixels in accordance with a SAO class parameter; and an adaptive loop filter configured to use two or more codebooks to indicate one or more filter coefficients in a bitstream, wherein the one or more primary parameters comprise the SAO class parameter and a SAO type parameter of the SAO filter and the one or more secondary parameters comprise the horizontal filter strength parameter and the vertical strength parameter, wherein the filter controller is configured to derive the secondary parameters based on the SAP class parameter and/or the SAO type parameter of the SAO filter, and wherein the filter controller is configured to select the two or more codebooks based on the SAO type parameter.

* * * * *